(12) United States Patent
Kim et al.

(10) Patent No.: US 10,517,078 B2
(45) Date of Patent: Dec. 24, 2019

(54) METHOD FOR TRANSMITTING/RECEIVING UPLINK SIGNAL BETWEEN BASE STATION AND TERMINAL IN WIRELESS COMMUNICATION SYSTEM, AND DEVICE FOR SUPPORTING SAME

(71) Applicant: LG ELECTRONICS INC., Seoul (KR)

(72) Inventors: Seonwook Kim, Seoul (KR); Suckchel Yang, Seoul (KR); Kijun Kim, Seoul (KR); Yunjung Yi, Seoul (KR); Eunsun Kim, Seoul (KR); Hyangsun You, Seoul (KR); Jaehyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/313,447

(22) PCT Filed: Jun. 28, 2017

(86) PCT No.: PCT/KR2017/006813
§ 371 (c)(1),
(2) Date: Dec. 26, 2018

(87) PCT Pub. No.: WO2018/004246
PCT Pub. Date: Jan. 4, 2018

(65) Prior Publication Data
US 2019/0159191 A1 May 23, 2019

Related U.S. Application Data

(60) Provisional application No. 62/357,391, filed on Jul. 1, 2016, provisional application No. 62/401,833, filed
(Continued)

(51) Int. Cl.
*H04W 72/12* (2009.01)
*H04W 72/04* (2009.01)
(Continued)

(52) U.S. Cl.
CPC ........... *H04W 72/0406* (2013.01); *H04L 5/00* (2013.01); *H04L 5/0048* (2013.01); *H04W 72/04* (2013.01);
(Continued)

(58) Field of Classification Search
CPC ........... H04W 72/1268; H04W 72/042; H04W 74/0808; H04L 5/0053
See application file for complete search history.

(56) References Cited

U.S. PATENT DOCUMENTS

2011/0158116 A1\* 6/2011 Tenny ............... H04W 56/0045
370/252
2013/0156003 A1\* 6/2013 Liang .................... H04L 5/0053
370/330
(Continued)

FOREIGN PATENT DOCUMENTS

KR 20140031901 A \* 3/2014 ........... H04L 1/1861
KR 20150048198 A \* 5/2015 ............ H04W 24/10
KR 20150084973 A \* 7/2015 .......... H04W 72/042

OTHER PUBLICATIONS

Intel Corporation, R1-162357, Transmission of Uplink Control Information on an LAA SCell, 3GPP TSG RAN WG1 #84bis, Apr. 2, 2016.(3GPP ftp upload date) See 3.4 Triggering Method for PUCCH, 3.5 PUCCH Transmission Schemes, pp. 3-4 (Year: 2016).\*
(Continued)

*Primary Examiner* — Wei Zhao
(74) *Attorney, Agent, or Firm* — Lee Hong Degerman Kang Waimey

(57) ABSTRACT

Disclosed are a method for transmitting/receiving an uplink signal between a base station and a terminal, and a device for
(Continued)

supporting the same. More specifically, disclosed are a method for transmitting/receiving a signal between a terminal and a base station for the coexistence of terminals to which different transmission time intervals (TTIs) are applied when the terminals to which the different TTIs are applied send an uplink signal on the same resource, and a device for supporting the same.

16 Claims, 12 Drawing Sheets

Related U.S. Application Data on Sep. 29, 2016, provisional application No. 62/420,571, filed on Nov. 11, 2016, provisional application No. 62/423,172, filed on Nov. 16, 2016, provisional application No. 62/443,775, filed on Jan. 8, 2017, provisional application No. 62/454,071, filed on Feb. 3, 2017.

(51) Int. Cl.
*H04L 5/00* (2006.01)
*H04W 72/14* (2009.01)
*H04W 76/27* (2018.01)
*H04W 88/02* (2009.01)
*H04W 88/08* (2009.01)

(52) U.S. Cl.
CPC ....... *H04W 72/0446* (2013.01); *H04W 72/12* (2013.01); *H04W 72/14* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2015/0117271 A1* | 4/2015 | Liang | H04L 1/1812 370/280 |
| 2015/0249980 A1 | 9/2015 | You et al. | |
| 2016/0095137 A1 | 3/2016 | Chen et al. | |
| 2018/0249458 A1* | 8/2018 | He | H04L 1/1607 |

OTHER PUBLICATIONS

PCT International Application No. PCT/KR2017/006813, Written Opinion of the International Searching Authority dated Oct. 26, 2017, 23 pages.
Catt, "Discussion on the simultaneous transmissions of normal TTI and sTTI", 3GPP TSG RAN WG1 Meeting #85, R1-164235, May 2016, 3 pages.
Nokia, et al., "Simultaneous Transmissions of UL Signals for Shortened TTI Operation", 3GPP TSG RAN WG1 Meeting #85, R1-164923, May 2016, 4 pages.
Huawei, et al., "Consideration on multiplexing of non-sTTI and sTTI in the same carrier", 3GPP TSG RAN WG1 Meeting #84bis, R1-162590, Apr. 2016, 4 pages.
Panasonic, "Multiplexinfg between non-sTTI and sTTI UEs", 3GPP TSG RAN WG1 Meeting #84bis, R1-162535, Apr. 2016, 4 pages.
Intel, "Transmission of Uplink Control Information on an LAA SCell", 3GPP TSG RAN WG1 Meeting #84bis, R1-162357, Apr. 2016, 6 pages.
Huawei, et al., "PUCCH resource allocation", 3GPP TSG RAN WG1 Meeting #82bis, R1-155638, Oct. 2015, 5 pages.
Ericsson, "Summary of e-mail discussions on uplink control signalling", 3GPP TSG RAN WG1 Meeting #87, R1-1613162, Nov. 2016, 24 pages.

* cited by examiner

METHOD FOR TRANSMITTING/RECEIVING UPLINK SIGNAL BETWEEN BASE STATION AND TERMINAL IN WIRELESS COMMUNICATION SYSTEM, AND DEVICE FOR SUPPORTING SAME

CROSS-REFERENCE TO RELATED APPLICATIONS

This application is the National Stage filing under 35 U.S.C. 371 of International Application No. PCT/KR2017/006813, filed on Jun. 28, 2017, which claims the benefit of U.S. Provisional Application No. 62/357,391, filed on Jul. 1, 2016, 62/401,833, filed on Sep. 29, 2016, 62/420,571, filed on Nov. 11, 2016, 62/423,172, filed on Nov. 16, 2016, 62/443,775, filed on Jan. 8, 2017, and 62/454,071, filed on Feb. 3, 2017, the contents of which are all hereby incorporated by reference herein in their entirety.

TECHNICAL FIELD

The present invention relates to a wireless communication system, and more particularly, to methods of transmitting and receiving uplink signals between a terminal and a base station in a wireless communication system and devices for supporting the same.

Specifically, the following disclosure relates to methods of transmitting and receiving signals between a terminal and a base station for coexistence of terminals to which different Transmission Time Intervals (TTIs) are applied when the terminals to which the different TTIs are applied transmit uplink signals on the same resource.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present invention is to provide methods of transmitting and receiving signals between a base station and a terminal (or user equipment) in a newly proposed communication system.

Specifically, the object of the present invention is to provide not only methods of transmitting and receiving signals between a base station and a user equipment but methods in which user equipments to which different TTIs are applied transmit and receive uplink signals to and from a base station with high reliability for coexistence thereof when the user equipments use the same resource for the uplink signal transmission.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides methods of transmitting and receiving uplink signals between a base station and a user equipment. Specifically, the present invention disclose methods of transmitting and receiving uplink signals between one of two user equipments using different TTIs and a base station when the two user equipments coexist during a predetermined time period.

In an aspect of the present invention, provided is a method of transmitting an uplink signal by a User Equipment (UE) to which a Transmission Time Interval (TTI) having a first time length is applied in a wireless communication system. The method may include: receiving an uplink grant scheduling uplink signal transmission during a second time interval, from a Base Station (BS) during a first time interval; receiving information on several symbols within the second time interval from the BS; and transmitting at least one of a Demodulation Reference Signal (DM-RS), a Physical Uplink Control Channel (PUCCH), and a Physical Uplink Shared Channel (PUSCH) in different symbols according to a structure determined based on the TTI having the first time length during the second time interval. In this case, the signal transmission may include performing either puncturing or rate-matching on each of the one or more symbols indicated by the received information within the structure determined based on the TTI having the first time length or transmitting the DM-RS irrespective of the structure determined based on the TTI having the first time length.

In another aspect of the present invention, provided is a User Equipment (UE) for transmitting an uplink signal in a wireless communication system, wherein a Transmission Time Interval (TTI) having a first time length is applied to the UE. The UE may include: a transmitter; a receiver; and a processor connected to the transmitter and the receiver. The processor may be configured to: receive an uplink grant scheduling uplink signal transmission during a second time interval, from a Base Station (BS) during a first time interval; receive information on several symbols within the second time interval from the BS; and transmit at least one of a Demodulation Reference Signal (DM-RS), a Physical Uplink Control Channel (PUCCH), and a Physical Uplink Shared Channel (PUSCH) in different symbols according to a structure determined based on the TTI having the first time length during the second time interval. In this case, the signal transmission may include performing either puncturing or rate-matching on each of the one or more symbols indicated by the received information within the structure determined based on the TTI having the first time length or transmitting the DM-RS irrespective of the structure determined based on the TTI having the first time length.

The information on the several symbols within the second time interval may be transmitted during the first time interval.

Alternatively, the information on the several symbols within the second time interval may be transmitted during a third time interval located between the first and second time intervals.

When the UE performs either the puncturing or the rate-matching on at least one symbol among the symbols indicated by the received information within the structure determined based on the TTI having the first time length, whether the UE performs either the puncturing or the rate-matching may be determined based on a time difference between the second and third time intervals.

The first time length may be equal to a length of a single time interval. For example, the length of the single time interval may be equal to a length of a single slot period in the system.

The structure determined based on the TTI having the first time length may include: a DM-RS transmitted in the first symbol within the single time interval; a PUSCH transmitted in the second to thirteenth symbols within the single time interval; and a PUCCH transmitted in the fourteenth symbol within the single time interval.

Alternatively, the structure determined based on the TTI having the first time length may include: a Physical Downlink Control Channel (PDCCH) transmitted in one or more symbols; a gap formed in one or more symbols; a PUSCH transmitted in one or more symbols; and a PUCCH transmitted in one or more symbols, along a time direction in the single time interval.

The information on the several symbols within the second time interval may include at least one of the following items: a location of a symbol where an uplink signal is emptied out; whether either the puncturing or the rate-matching is performed as an operation for emptying the uplink signal; a location of a symbol where a DM-RS is additionally transmitted; and sequence information of the additionally transmitted DM-RS.

In this case, some of the information on the several symbols within the second time interval may be transmitted via higher layer signaling.

In a further aspect of the present invention, provided is a configuration of a Base Station (BS), which is a counterpart of the above-described UE configuration. Here, a first User Equipment (UE) may be equivalent to the aforementioned UE. Specifically, a method of receiving an uplink signal by the BS from the first UE during a time period in which the first UE to which a Transmission Time Interval (TTI) having a first time length is applied coexists with a second UE to which a TTI having a second time length is applied in a wireless communication system may include: transmitting an uplink grant scheduling uplink signal transmission during a second time interval, to the first UE during a first time interval; if the first and second UEs coexist during the second time interval, transmitting information on several symbols within the second time interval to the first UE; and receiving, from the first UE, at least one of a Demodulation Reference Signal (DM-RS), a Physical Uplink Control Channel (PUCCH), and a Physical Uplink Shared Channel (PUSCH) in different symbols according to a structure determined based on the TTI having the first time length during the second time interval. The signal reception may include receiving, from the first UE, uplink signals where either puncturing or rate-matching is performed on each of the one or more symbols within the second time interval or the DM-RS.

In a still further aspect of the present invention, provided is a Base Station (BS) for receiving an uplink signal from a first User Equipment (UE) during a time period in which the first UE to which a Transmission Time Interval (TTI) having a first time length is applied coexists with a second UE to which a TTI having a second time length is applied in a wireless communication system. The BS may include: a transmitter; a receiver; and a processor connected to the transmitter and the receiver. The processor may be configured to: transmit an uplink grant scheduling uplink signal transmission during a second time interval, to the first UE during a first time interval; transmit information on several symbols within the second time interval to the first UE if the first and second UEs coexist during the second time interval; and receive, from the first UE, at least one of a Demodulation Reference Signal (DM-RS), a Physical Uplink Control Channel (PUCCH), and a Physical Uplink Shared Channel (PUSCH) in different symbols according to a structure determined based on the TTI having the first time length during the second time interval. In this case, the signal reception may include receiving, from the first UE, uplink signals where either puncturing or rate-matching is performed on each of the one or more symbols within the second time interval or the DM-RS.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, UEs to which different TTIs are applied can coexist and transmit uplink signals using the same resource in a newly proposed wireless communication system.

In addition, according to the present invention, UEs to which different TTIs are applied can coexist and receive downlink signals using the same resource.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
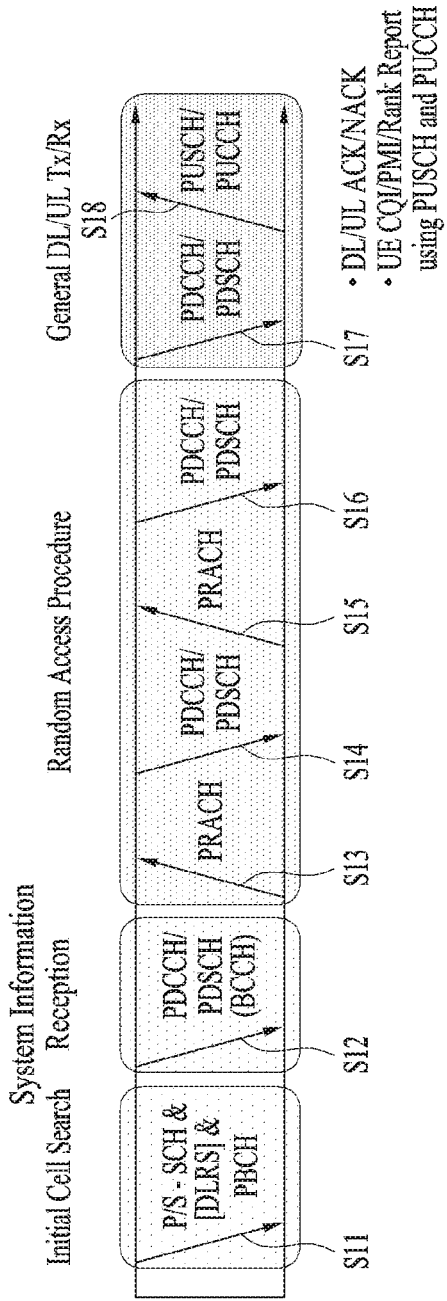
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
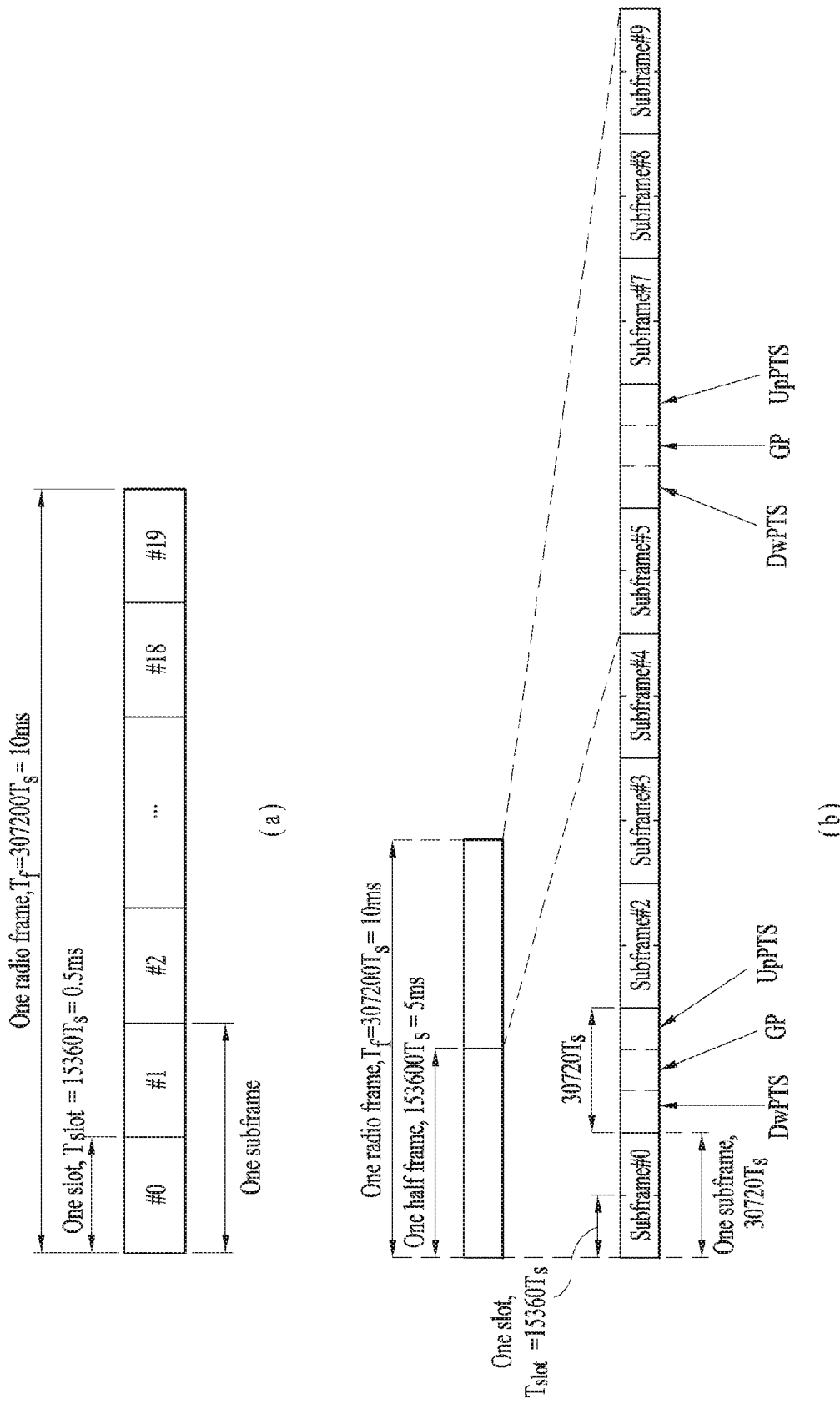
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | | | |

Figure 3:
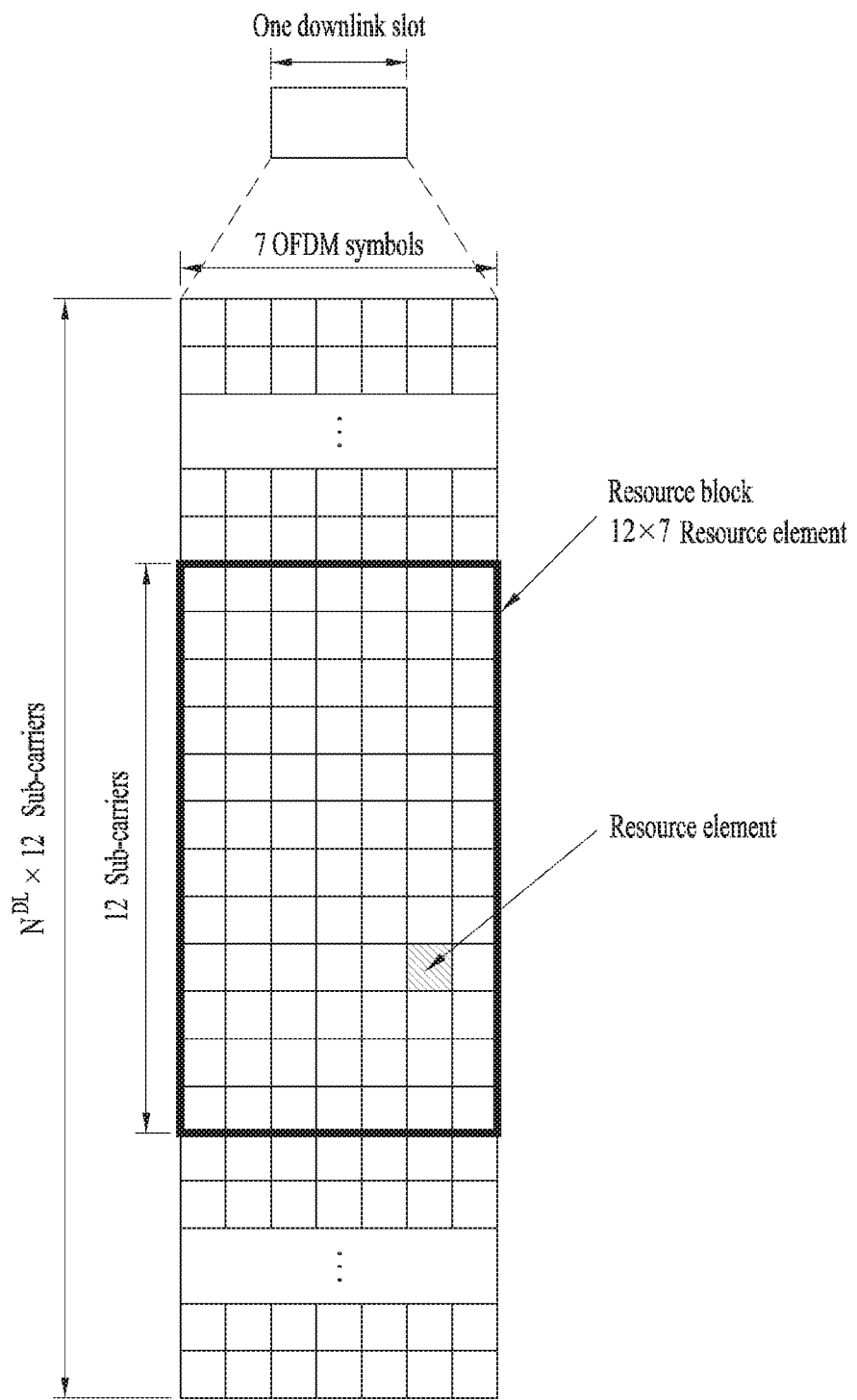
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
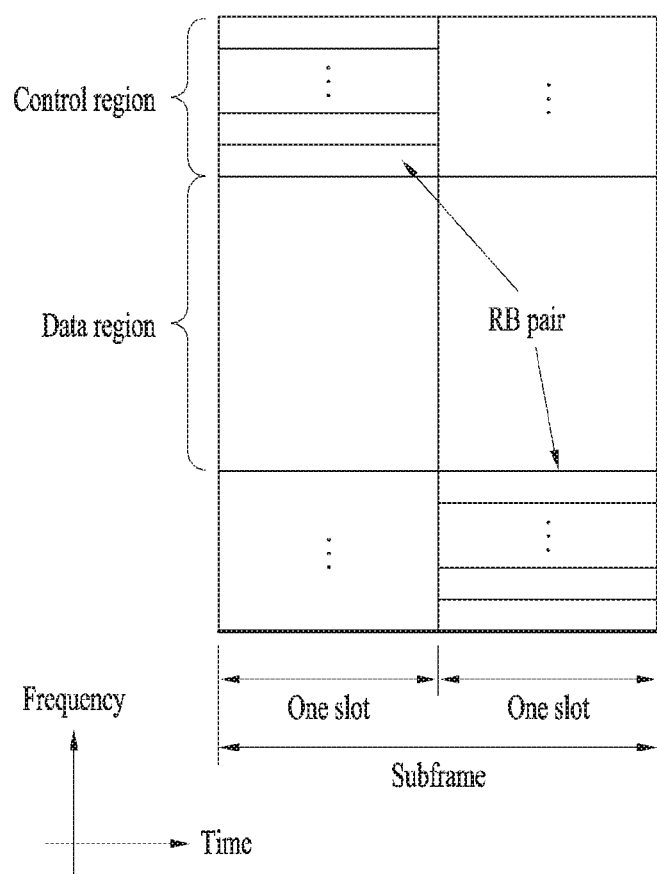
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
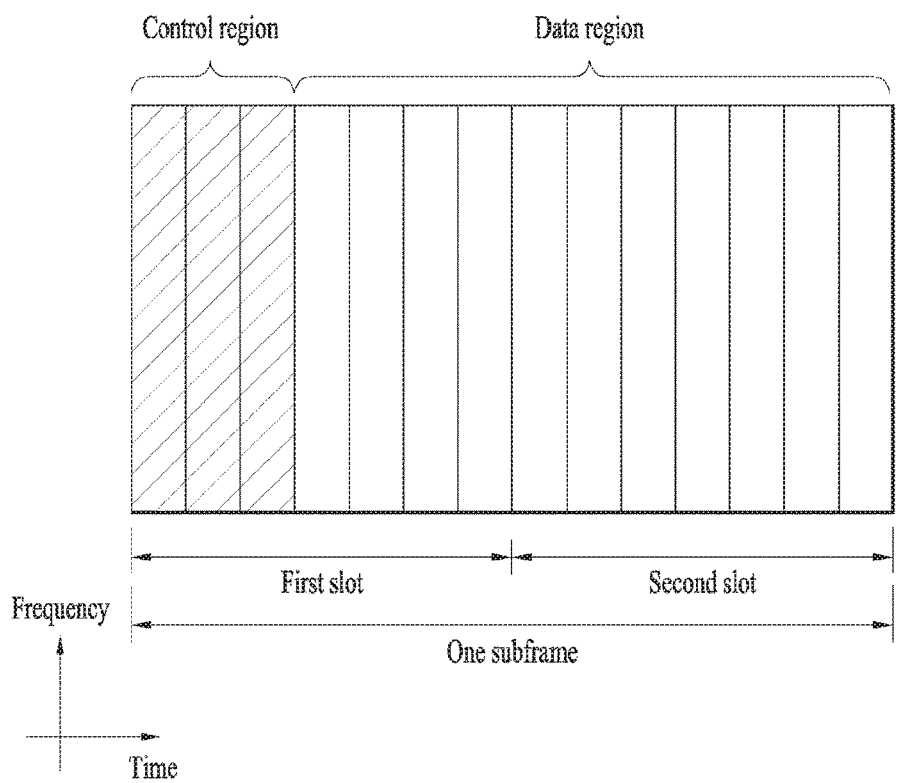
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 6:
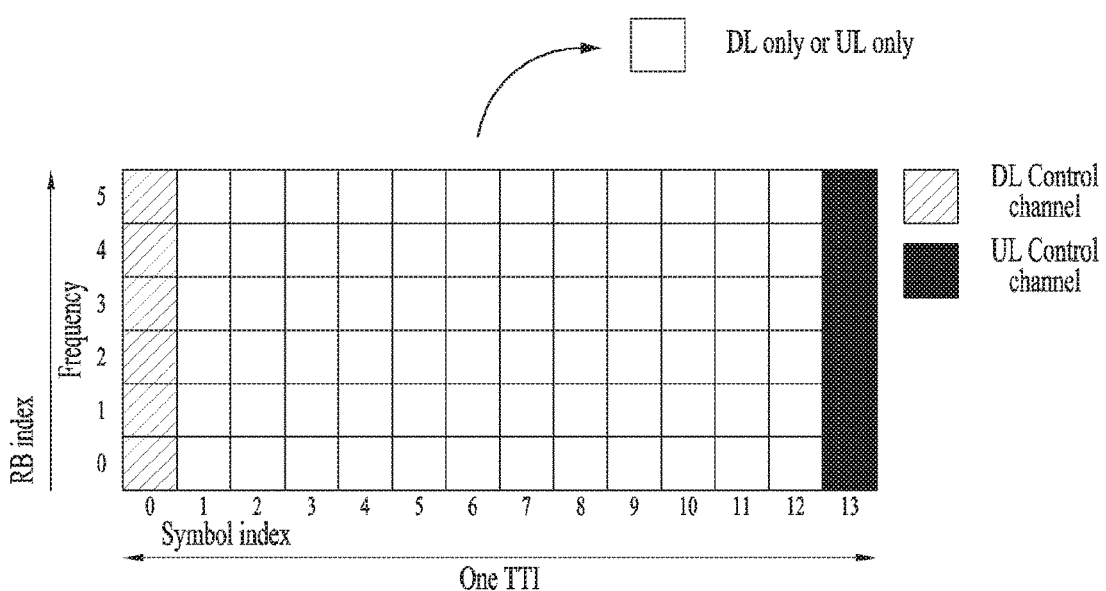
FIG. 6 is a diagram illustrating a self-contained subframe structure applicable to the present invention.

FIG. 6 is a diagram illustrating a self-contained subframe structure applicable to the present invention.

In the NR system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing ($\Delta f$) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
| --- | --- | --- | --- | --- |
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
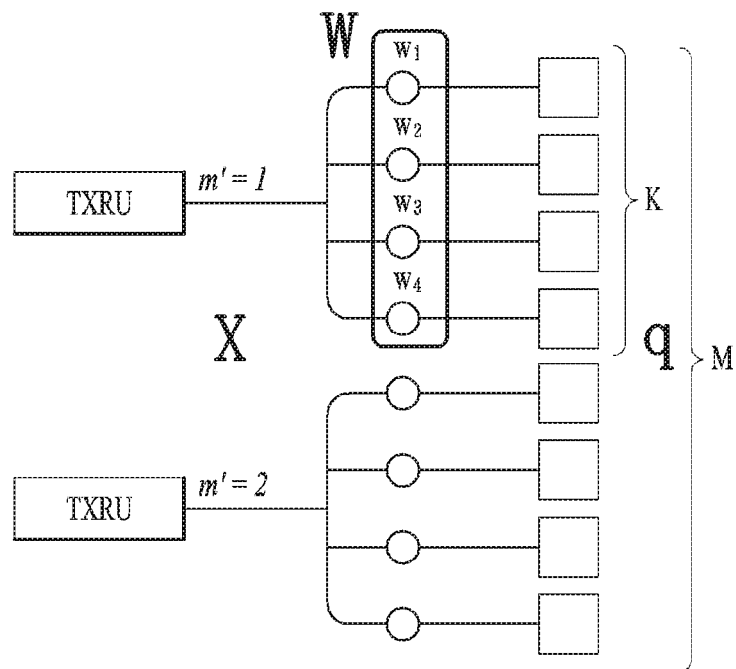
FIGS. 7 and 8 are diagrams illustrating representative methods for connecting TXRUs to antenna elements.
Figure 8:
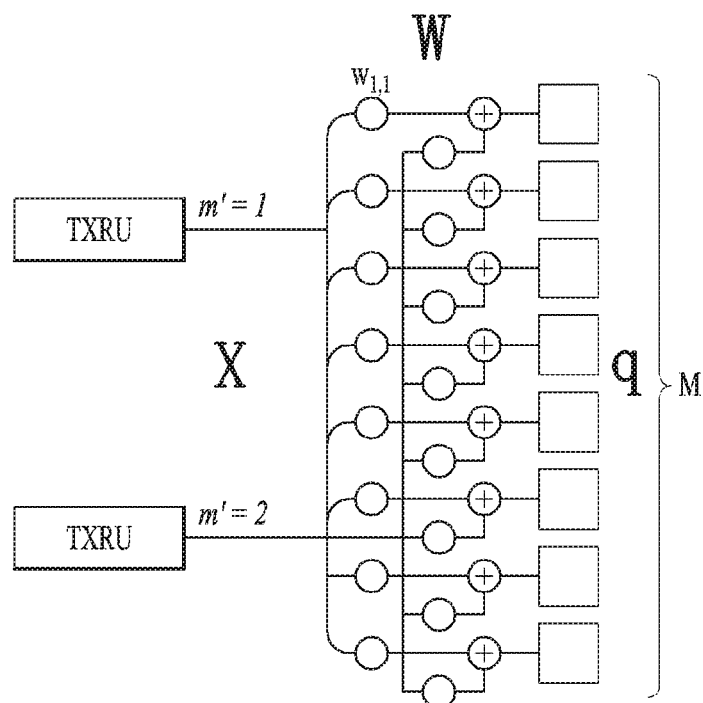

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

2.4. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

3. Proposed Embodiment

Based on the above technical discussion, the present invention proposes DL/UL signal transmission methods for handling various issues and methods for supporting the same.

3.1. Method for Transmitting Multiple Data with Different Latency Issues

In this section, methods for transmitting data (e.g., PUSCH) with different latency issues will be described.

When a UE performs UL transmission, if data where latency is important (e.g., Ultra-Reliable and Low-Latency Communication (URLLC) data) and data where latency is relatively less important (e.g., enhanced Mobile Broadband (eMBB) data) is multiplexed and transmitted on the same frequency resources in the same cell, the transmission resources of the two pieces of data may collide to with other.

In this case, the data where the latency is less important (hereinafter this type of data is referred to as PUSCH1) may be transmitted before the data where the latency is important (hereinafter this type of data is referred to as PUSCH2). If the UE is transmitting PUSCH1, the UE may continue transmitting PUSCH1 regardless of whether PUSCH2 is scheduled. Thus, PUSCH1 may cause serious interference to PUSCH2 where the latency is relatively more important. Therefore, a method for reducing the impact of PUSCH2 on PUSCH1 needs to be researched for successful transmission of PUSCH2, and the present invention proposes the following data transmission methods for the successful transmission of PUSCH2.

3.1.1. First Method (Dropping of PUSCH Transmission)

For successful transmission of PUSCH2, if transmission resources of PUSCH1 and PUSCH2 overlap, a UE may drop PUSCH1 transmission according to the following methods.

(1) A new DL channel can be introduced to inform a UE whether PUSCH transmission is dropped. In the present invention, this new DL channel is referred to as a PUSCH_Drop channel for convenience of description.

Specifically, one or multiple PUSCH_Drop channels may exist in a subframe, a TTI, or an OFDM symbol region in which data is transmitted, and each PUSCH_Drop channel may be located in a different region (e.g., OFDM symbol).

If the UE is instructed to drop PUSCH transmission through at least one PUSCH_Drop channel while receiving a PUSCH_Drop channel(s), the UE may instantaneously drop the PUSCH transmission. In this case, after stopping the PUSCH transmission, the UE does not need to receive a PUSCH_Drop channel in a subframe, a TTI, or an OFDM symbol region where a corresponding PUSCH is transmitted.

In this case, one of the following methods can be used to indicate the PUSCH transmission stop through the PUSCH_Drop channel.

1) 1-bit data is transmitted on the corresponding channel.
2) A sequence constituting the corresponding channel differs according to a value of 1-bit information.

(2) A BS (eNB) may inform a UE whether PUSCH transmission is dropped by changing a sequence or scrambling sequence of a specific DL Reference Signal (RS).

For example, assuming that there are scrambling sequences A and B, if scrambling sequence A is applied to an RS, it may mean that PUSCH transmission is not dropped. On the other hand, if scrambling sequence B is applied to the RS, it may mean that PUSCH transmission is dropped.

There may be one or more RSs in a subframe, a TTI, or an OFDM symbol region in which data is transmitted. In particular, independent scrambling sequences may be applied to RSs located in different time regions (e.g., different OFDM symbols). In this case, while a UE receives RSs in different time regions (e.g., different OFDM symbols), if a scrambling sequence applied to an RS transmitted in at least one time region (e.g., at least one OFDM symbol) indicates that PUSCH transmission is to be dropped, the UE may instantaneously drop the PUSCH transmission.

In the first method, the above-described eNodeB indication or configuration (e.g., PUSCH transmission dropping) may be transmitted on a cell/carrier that carries data. Alternatively, considering a Carrier Aggregation/Dual Connectivity (CA/DC) environment, the eNodeB indication/configuration may be transmitted on cells/carriers designated by a PCell or eNodeB. In this case, such cells may be limited to specific cells/carriers on which DL transmission is performed during a subframe/time duration in which a UE transmits data. Alternatively, the eNodeB indication/configuration may be configured based on a random cell/carrier among specific cells/carriers on which DL transmission is performed in a subframe where data is received.

3.1.2. Second Method (Indication of Location of OFDM Symbol or OFDM Symbol Group where PUSCH is Punctured For successful transmission of PUSCH2, if transmission resources of PUSCH1 and PUSCH2 overlap, a UE may puncture transmission of PUSCH1 on the overlapping OFDM symbol resources. To this end, a BS (eNB) may inform the UE whether data puncturing is performed on a corresponding OFDM symbol or OFDM symbol group (and/or a next OFDM symbol (or OFDM symbol group)) on an OFDM symbol or OFDM symbol group basis.

(1) A New DL Channel can be Introduced, and an eNB May Inform a UE Whether PUSCH Transmission is Dropped Using the Corresponding Channel.

Specifically, there may be a plurality of channels with respect to each OFDM symbol or OFDM symbol group. In addition, the eNB may inform the UE whether PUSCH puncturing is performed on an OFDM symbol or OFDM symbol group used for transmitting a corresponding channel (and/or an OFDM symbol or OFDM symbol group next to the OFDM symbol or OFDM symbol group used for transmitting the corresponding channel) in each channel Such an indication may be transmitted as follows.

1) 1-bit data is transmitted on the corresponding channel.
2) A sequence constituting the corresponding channel differs according to a value of 1-bit information.

(2) An eNB may inform a UE whether PUSCH transmission is dropped (or punctured) in a specific OFDM symbol or OFDM symbol group by changing a sequence or scrambling sequence of an RS. In this case, the specific OFDM symbol or OFDM symbol group may mean an OFDM symbol or OFDM symbol group in which the corresponding RS is transmitted (and/or an OFDM symbol or OFDM symbol group next to the OFDM symbol or OFDM symbol group in which the corresponding RS is transmitted). For example, assuming that there are scrambling sequences A and B, if scrambling sequence A is applied to an RS, it may mean that a PUSCH is transmitted in an OFDM symbol or OFDM symbol group in which the RS is transmitted. On the other hand, if scrambling sequence B is applied to the RS, it may mean that the PUSCH is punctured in the OFDM symbol or OFDM symbol group in which the RS is transmitted.

In the second method, the above-described eNodeB indication/configuration (e.g., PUSCH puncturing) may be transmitted on a cell/carrier that carries data. Alternatively, considering a CA/DC environment, the eNodeB indication/configuration may be transmitted on cells/carriers designated by a PCell or eNodeB. In this case, such cells may be limited to specific cells/carriers on which DL transmission is performed during a subframe/time duration where a UE transmits data. Alternatively, the eNodeB indication/configuration may be configured based on a random cell/carrier among specific cells/carriers on which DL transmission is performed in a subframe where data is received.

3.1.3. Third Method (Transmission of PUSCH where Latency is Important with High Power)

For successful transmission of PUSCH2, if a transmission resource of PUSCH2 is being used for another PUSCH, a UE may increase transmission power of PUSCH2 in order to increase the transmission success probability of PUSCH2.

(1) To this end, if a PUSCH, which is to be transmitted in a short TTI, is scheduled, an eNB may set an absolute PUSCH power value through DCI that schedules the PUSCH in order for a UE to transmit the PUSCH with high power regardless of the previous PUSCH transmission power.

A specific value of a field for setting PUSCH power in DCI that schedules a PUSCH may indicate the maximum PUSCH transmission power or a specific power value. In addition, the PUSCH transmission power may be set to the maximum value or a specific power value by another explicit field of the DCI that schedules the PUSCH. These rules may be predetermined between the eNB and the UE or signaled by the eNB.

(2) In the case of URLLC UL data transmitted in an sTTI, a UE may always perform transmission with the maximum power or a specific power value.

(3) If a UE detects that another signal is being transmitted through sensing before transmitting a PUSCH (in particular, URLLC UL data transmitted in an sTTI), the UE may transmit the URLLC UL data, which is transmitted in the sTTI, with the maximum power or a specific power value.

In the third method, a specific power value may be defined in relevant specifications (e.g., 3GPP, etc.) or may be signaled to a UE through system information or Radio Resource Control (RRC) signaling.

3.2. Signal Transmission and Reception Method for UEs with Different TTI Sizes

In the legacy LTE system, a Transmission Time Interval (TTI) has been defined as the minimum time interval used by a Medium Access Control (MAC) layer to deliver MAC Protocol Data Units (PDUs) to a physical (PHY) layer. That is, since a UE may be instructed to receive DL data or transmit UL data in a TTI(s), the UE should attempt to receive a DL control channel including scheduling information for DL data or UL data at least per TTI.

Until LTE Release 13, the TTI was equal to one subframe (SF) or 1 ms. However, beyond LTE Release 14, the introduction of a TTI with a length less than 1 ms (e.g., two or seven symbols) has been discussed. In addition, various sizes of TTIs can be introduced in the NR system. This is because individual UEs may have different coverage and different amounts of traffic or service requirements may be changed depending on use cases (e.g., eMBB, URLLC, etc.). Therefore, methods for supporting coexistence of UEs with different TTIs will be described in this section.

3.2.1. UL Signal Transmission and Reception Method

Figure 9:
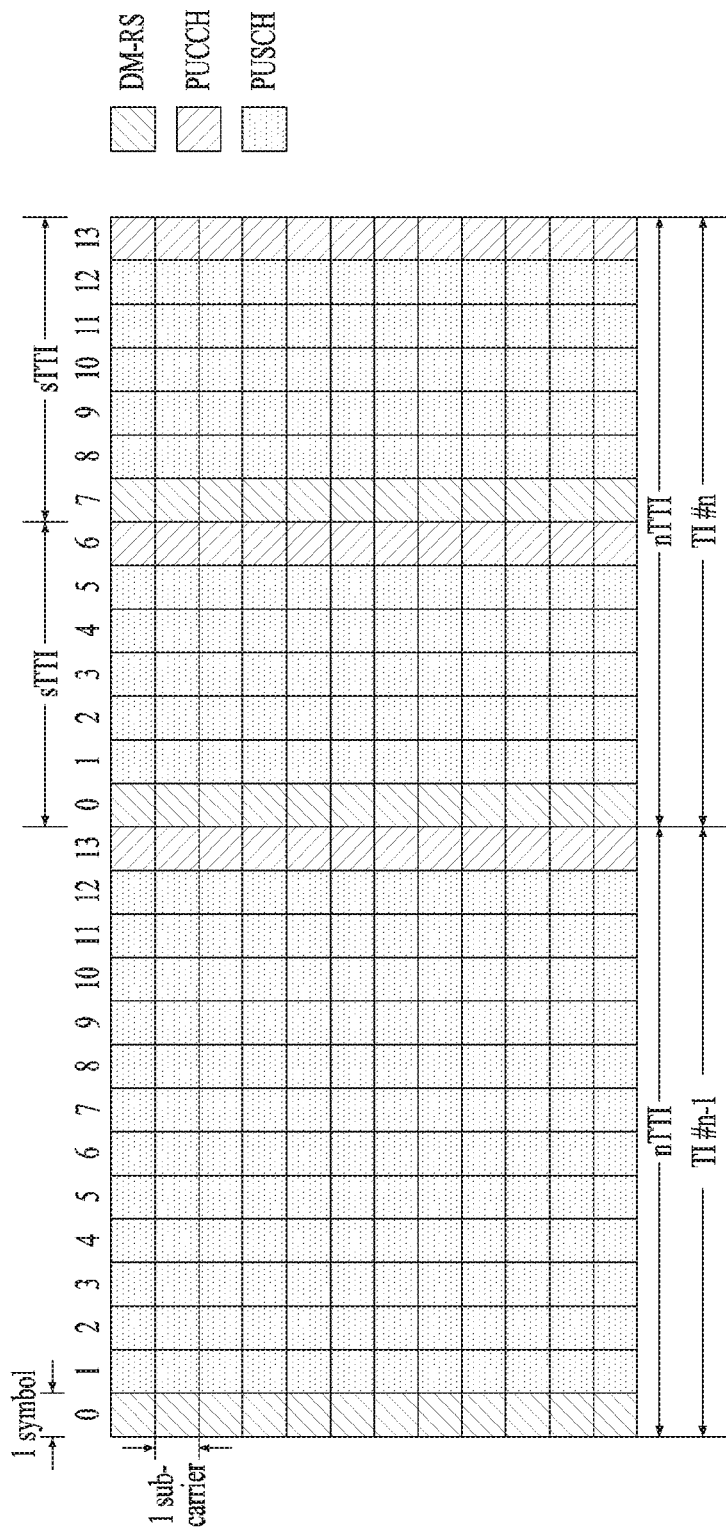
FIG. 9 illustrates a method in which UEs with different TTIs perform signal transmission during consecutive Time Intervals (TIs)

FIG. 9 illustrates a method in which UEs with different TTIs perform signal transmission during consecutive TIs.

In FIG. 9, a TTI with the same length as one TI is defined as a normal TTI (nTTI), and a TTI shorter than one TI is defined as a short TTI (sTTI). In this case, one TI may be composed of fourteen symbols. If an nTTI UE is scheduled to perform UL data transmission in TI #n−1 by a UL grant transmitted in TI #n−k−1 (for example, k=4) (k may depend on a UE or use case), the nTTI UE may transmit a Demodulation Reference Signal (DM-RS) in the first symbol in TI #n−1, a PUCCH in the last symbol therein, and a PUSCH in the remaining symbols.

The signal transmission method disclosed in FIG. 9 is merely one example applicable to the present invention, and the order of channels or signals in one TI may be changed. For example, one TI may be configured in the following order: DL control/guard period/UL data/UL control.

Similarly, when an nTTI UE is scheduled to perform UL data transmission in TI #n by a UL grant in TI #n−k, the nTTI UE may configure DM-RS/PUSCH/PUCCH regions using the same method used in TI #n−1.

However, if the nTTI UE is in the MU-MIMO relationship with an sTTI UE in the same time and frequency regions, the nTTI UE may transmit a UL signal/channel by considering DM-RS/PUCCH transmission at the sTTI UE. In other words, to coexist with the sTTI UE, the nTTI UE may empty a portion corresponding to the PUCCH/DM-RS for the sTTI UE (e.g., symbols #6 and #7) in the PUSCH region within TI #n and perform PUSCH transmission in the remaining region by performing either puncturing or rate-matching thereon In addition, the nTTI UE may be configured to transmit an additional DM-RS in symbol #7 to improve the performance of nTTI PUSCH reception. In this case, quasi-orthogonality between a DM-RS to be transmitted from the sTTI UE and a DM-RS to be transmitted from the nTTI UE should be guaranteed.

As described above, a UE should know which symbol(s) will be emptied in a PUSCH region, whether either puncturing or rate-matching will be performed, which symbol will be used to transmit a DM-RS, and which DM-RS sequence will be transmitted. Therefore, relevant information can be signaled. In the example of FIG. 9, the UL grant in TI #n−k for scheduling the operation in TI #n may include some or all of the following item.

The location of a symbol(s) where UL data should be deleted (and a specific frequency resource in the corresponding symbol region)

Whether either puncturing or rate-matching is performed

Whether an additional DM-RS is transmitted in a symbol(s) among the symbols where the UL data is deleted and the transmission location of the DM-RS Information about the sequence of the additional DM-RS (e.g., root index, Cyclic Shift (CS), Orthogonal Cover Code (OCC), etc.)

Some of the above information may be predetermined or configured by higher layer signaling.

For example, whether either the puncturing or rate-matching is performed may be determined in advance.

In addition, the sequence information of the additionally transmitted DM-RS may be configured by higher layer signaling in advance or determined from the DM-RS information included in the UL grant transmitted in TI #n-k according to predefined rules. In this case, the predefined rules may be that a CS value of the additionally transmitted DM-RS is determined as a CS value of the DM-RS indicated by the UL grant+an offset value (which is predetermined or configured by higher layer signaling) or that the additional transmission is performed using the same CS but by multiplying a predetermined OCC per symbol.

Alternatively, a rule may be established as follows: if the DM-RS indicated by the UL grant in TI #n−k is transmitted in a comb-type manner, another UE transmits a DM-RS using another comb index.

Although it is possible to inform the nTTI UE whether there is coexistence with the sTTI UE using TI #n−k that schedules TI #n as described above, the BS (eNB) may not know whether the sTTI and nTTI UE coexist in TI #n-K because scheduling latency for the sTTI UE is short in general. In this case, the eNB may additionally inform the nTTI UE of the presence of the sTTI UE in TI #n−x (where 0<=x<k).

A UL grant indicating the presence of the sTTI UE may be transmitted through UE-specific DCI. Alternatively, the UL grant may be transmitted through compact DCI with small bit-width because the amount of information to be signaled is relatively small compared to the UL grant transmitted in TI #n−k.

Alternatively, the UL grant indicating the presence of the sTTI UE may be transmitted through UE-group or cell-common DCI. This is because when MU-MIMO is applied to UEs in the same frequency region as shown in FIG. 9 or when UEs are FDMed in the same TI, an nTTI UE may recognize that it coexists with an sTTI UE and the nTTI UE may perform PUSCH transmission after emptying a PUCCH region for the coexistence with the sTTI UE.

In addition, whether either the rate-matching or puncturing is performed on the UL data configured in the PUSCH region may be determined according to the value of x. For example, a rule may be established as follows: if a UE is unable to perform rate-matching in a PUSCH region less than one TI due to implementation limitations, the UE may perform the rate-matching only in the case of x>1 and perform puncturing in the case of x=1.

Although this method is described on the assumption that nTTI and sTTI UEs coexist, the method can also be applied when a UE with a certain TTI coexist with a UE with a relatively small TTI. In addition, the method can be applied when UEs, which have different symbol lengths between carriers or subbands or on the same frequency resource due to different numerology and subcarrier spacing, coexist.

Moreover, the PUCCH/DM-RS of the sTTI UE may be located in the middle of the UL data region of the nTTI UE. Further, the DL control/DL data/guard period/DL signal/UL data/UL signal for the sTTI UE may be additionally located in the middle of the UL data region of the nTTI UE. Thus, the nTTI UE may be configured to perform UL data transmission by emptying some symbols under the consideration of the above items.

3.2.2. DL Signal Transmission and Reception Method

As described above, UEs with various TTI sizes may coexist when UL data/control transmission is performed. Similarly, UEs with various TTI sizes may coexist when DL data/control transmission is performed. Hereinafter, DL data reception methods when UEs with various TTI sizes coexist will be described.

Figure 10:
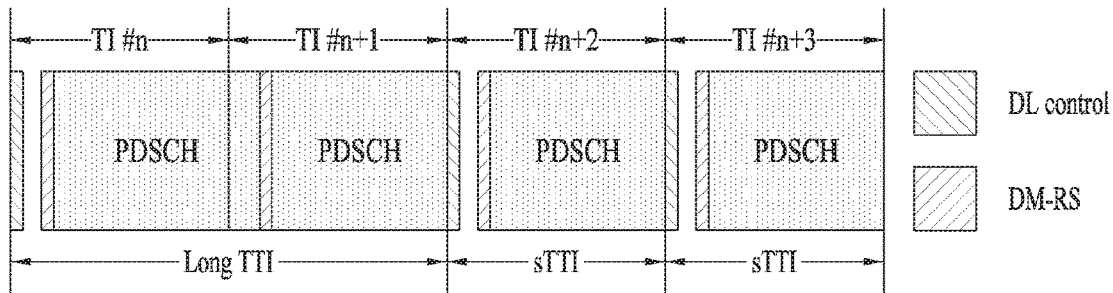
FIG. 10 illustrates a method of transmitting and receiving DL control and data signals when UEs with various TTI sizes coexist.

FIG. 10 illustrates a method of transmitting and receiving DL control and data signals when UEs with various TTI sizes coexist. In FIG. 10, a TTI with the same length as a TI is defined as an nTTI, a TTI longer than a TI is defined as a long TTI, and a TTI shorter than a TI is defined as an sTTI.

If a PDSCH only for a long TTI UE, which use two TIs, is transmitted in TI #n and TI #n+1 as shown in the example of FIG. 10, the PDSCH may be continuously transmitted in TI #n+1 with no additional DL control signal. However, if a PDSCH for an sTTI UE is transmitted in TI #n+2 and TI #n+3, the coexistence of the long TTI UE and sTTI UE should be considered during the corresponding two TIs.

In this case, if there are a guard period/UL control/UL data/UL signal/DL signal at the end of TI #n+2 or there are DL control/guard period at the start of TI #n+3, an eNB should transmit relevant information to UEs. Additionally, the eNB may inform the UEs that the symbol location of a DM-RS to be transmitted in TI #n+3 can also be changed.

Information indicating that a PDSCH is transmitted while a symbol(s) in a specific TI in a TTI is unoccupied and information indicating that a DM-RS transmission symbol location is changed may be transmitted through a UE-specific or UE-group DL grant that schedules the PDSCH in the corresponding TTI or cell-common DCI.

In addition, when one TTI is composed of multiple DL/UL TIs, one Transport Block (TB) may be mapped to the entirety of the TTI and then transmitted (for the purpose of securing coverage) or one TB may be repeatedly transmitted in each TI.

When a PDSCH or PUSCH scheduled in multiple DL/UL TIs (slots or subframes) is transmitted or received, one TB may be transmitted across the entirety of the corresponding scheduled resource region. Hereinafter, a method of determining a Transport Block Size (TB S) of the corresponding TB and an SCH resource mapping method will be described.

3.2.2.1 TBS Determination Method

In the legacy LTE system, a TBS is determined by a function of a Modulation and Coding Scheme (MCS) level and a size of an allocated Physical Resource Block (PRB). Considering this TBS determination, a PRB size can be defined as the sum of PRBs allocated to all slots in determining a TBS of a TB scheduled across multiple slots according to the present invention. For example, if one TB is scheduled across three slots and ten PRBs are allocated per slot, the TBS of the corresponding TB may be determined based on a function of an MCS level and thirty PRBs.

3.2.2.2. SCH Resource Mapping Method

In the legacy LTE system, frequency-first mapping is applied to a PDSCH and time-first mapping is applied to a PUSCH. However, in the case of a PUSCH, after resource mapping, all modulation symbols transmitted in the same OFDM symbol are linearly combined by Discrete Fourier Transform (DFT)—precoding and then transmitted on individual subcarriers. This operation could be interpreted to mean that time-first mapping is performed by considering a subcarrier as a logical subcarrier index when the resource mapping is performed.

Figure 11:
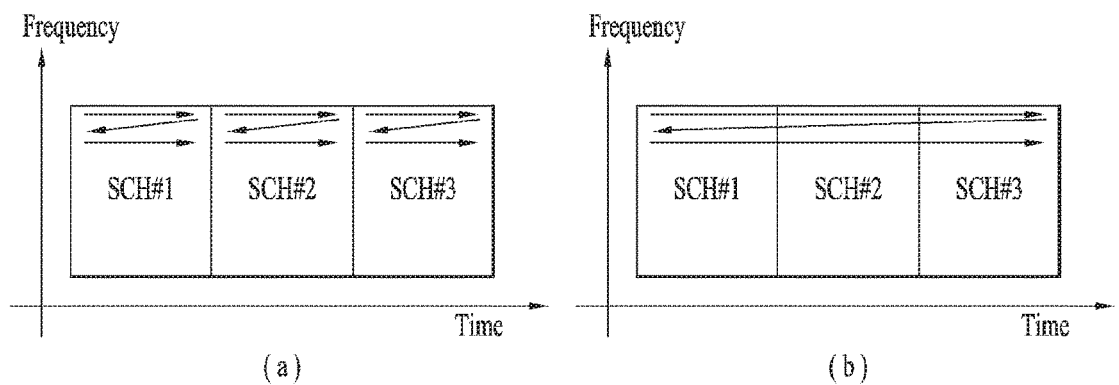
FIGS. 11 and 12 illustrate Shared Channel (SCH) resource mapping methods applicable to the present invention.
Figure 12:
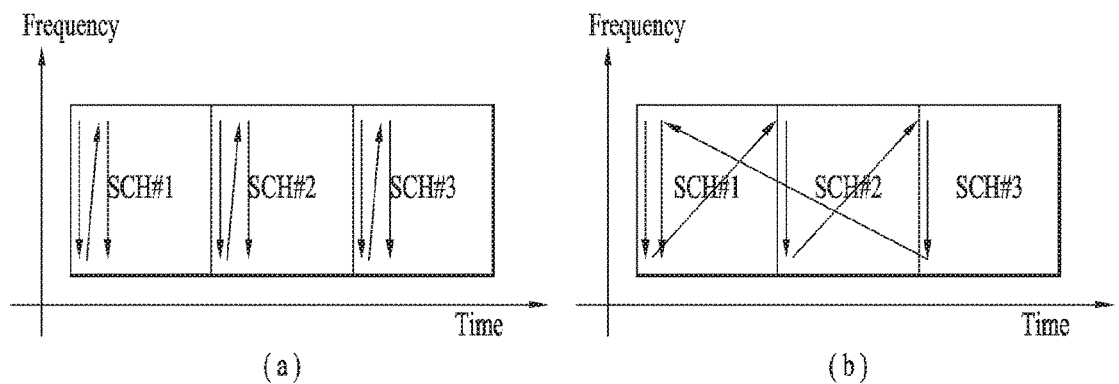

FIGS. 11 and 12 illustrate SCH resource mapping methods applicable to the present invention.

When an SCH is transmitted based on time-first mapping as shown in FIG. 11, the time-first mapping may be performed in each slot as shown in the example of FIG. 11(a). Alternatively, resource mapping may be performed first on all symbols included in whole slots scheduled for a specific subcarrier index and then continue for the next subcarrier index as shown in the example of FIG. 11(b). In this case, since one codeblock is transmitted across multiple slots, time diversity gain can be obtained.

When an SCH is transmitted based on frequency-first mapping as shown in FIG. 12, the frequency-first mapping may be performed in each slot as shown in the example of FIG. 12(a). Alternatively, resource mapping may be performed first on all subcarriers included in whole RBs scheduled for a specific symbol index and then continue for the next symbol index as shown in the example of FIG. 12(b).

3.2.3. DL Signal Transmission Method for Coexistence of UEs with Different TTIs

For DL data transmission, the coexistence of nTTI and sTTI UEs can be considered similar to the example shown in FIG. 9 (i.e. example of UL data transmission).

Figure 13:
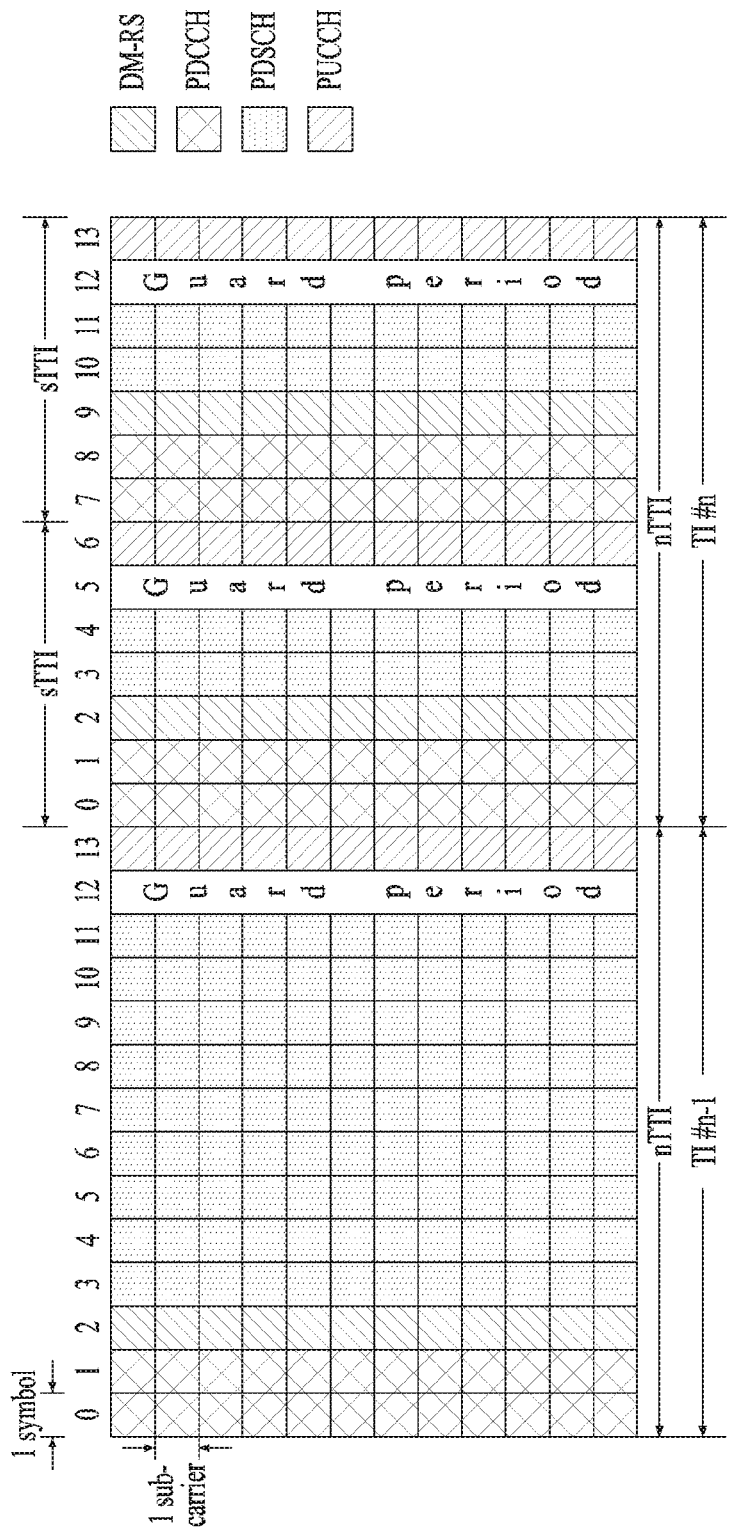
FIG. 13 illustrates a method in which UEs with different TTIs perform signal transmission during consecutive TIs.

FIG. 13 illustrates a method in which UEs with different TTIs perform signal transmission during consecutive TIs.

As shown in FIG. 13, an nTTI UE may coexist with sTTI UEs in TI #n through MU-MIMO (or FDM). To this end, an eNB may indicate the nTTI UE that transmission is performed while some symbols in a PDSCH region to be transmitted in TI #n are unoccupied. For example, as shown in FIG. 13, the eNB may inform the nTTI UE that symbols #5/#6/#7/#8/#9 are empty and a DM-RS is transmitted in symbol #9. Similar to the above-described proposal, information indicating that a PDSCH is transmitted while a symbol(s) in a TTI is empty and information indicating that a DM-RS transmission symbol location is added (or changed) may be transmitted through a UE-specific or UE-group DL grant that schedules the PDSCH in the corresponding TTI or cell-common DCI.

However, the frame structure illustrated in FIG. 13 is merely one example. In addition, a PDCCH region, a DM-RS symbol location, the presence/location/length of a guard period, the presence/location/length of a PUCCH region, etc. may be changed, and other signals/channels may also be additionally transmitted.

In the examples of FIGS. 9, 10, and 13, if a specific UE is multiplexed with another UE with a relatively small TTI, each small TTI may have a different interference environment in terms of data reception, and thus the specific UE should receive data by considering such a different interference environment. For example, referring to FIG. 13, when the nTTI UE receives the PDSCH in TI #n, the interference environment in symbol #3/#4 may be different from that in symbol #10/#11.

In the MIMO system, a receiver with multiple reception antennas may generally use a Minimum Mean Square Error (MMSE) method as a reception algorithm. The MMSE reception method may be categorized into multiple types depending on how interference properties are reflected. To distinguish between MMSE receiver types, the MIMO system defines a received signal as follows.

$$y = H_s P_s x_s + H_s P_c x_c + \sum_k H_k P_k x_k + n \quad \text{[Equation 1]}$$

In Equation 1, H indicates a channel matrix, P indicates a transmission precoding matrix, and x indicates a transmission data vector. In addition, $H_s P_s x_s$ indicates a desired signal transmitted to a corresponding UE, $H_s P_c x_c$ indicates a signal for a UE that is mutually scheduled by MU-MIMO paring, $H_k P_k x_k$ indicates an interference signal from a kth different cell, and n indicates Gaussian noise.

A reception weight matrix of an MMSE receiver can be defined as follows according to the receiver type. In Equations below, $\tilde{H}_s = H_s \cdot P_s$, $\tilde{H}_c = H_s \cdot P_c$, and $\tilde{H}_k = H_k P_k$. In addition, $\sigma_{IN,antenna\ \#i}^2$ indicates noise and total interference power measured at an ith reception antenna, and $\sigma_{IoN,antenna\ \#i}^2$ indicates the sum of interference power and noise power from other transmission points except a serving transmission point measured at the ith reception antenna.

The MMSE type 1 receiver can be defined as shown in Equation 2, the MMSE type 2 receiver can be defined as shown in Equation 3, and the MMSE type 3 receiver (e.g., MMSE-IRC (Interference Rejection Combining) receiver) can be defined as shown in Equation 4.

$$w_1 = \tilde{H}_s^H \left( \tilde{H}_s \tilde{H}_s^H + \text{diag}(\sigma_{IN,antenna\#i}^2) \right)^{-1} \quad \text{[Equation 2]}$$

$$w_2 = \tilde{H}_s^H \left( \tilde{H}_s \tilde{H}_s^H + \tilde{H}_c \tilde{H}_c^H + \text{diag}(\sigma_{IoN,antenna\#i}^2) \right)^{-1} \quad \text{[Equation 3]}$$

$$w_{IRC} = \tilde{H}_s^H \left( \tilde{H}_s \tilde{H}_s^H + \tilde{H}_c \tilde{H}_c^H + \sum_k \tilde{H}_k \tilde{H}_k^H + \sigma_N^2 \cdot I \right)^{-1} \quad \text{[Equation 4]}$$

As the simplest receiver, the MMSE type 1 receiver assumes that the covariance matrix of all interference signals including noise is a diagonal matrix. In other words, the MMSE type 1 receiver assumes that there is no correlation between interference signals received by individual reception antennas.

Unlike the MMSE type 1 receiver, the MMSE type 2 receiver recognizes a signal for a co-scheduled MU-MIMO UE and minimize the interference from the corresponding signal by considering the covariance matrix of the corresponding signal.

The MMSE type 3 receiver is called the MMSE-IRC receiver. Since the MMSE type 3 receiver determines the receiving direction of a desired signal by considering the covariance matrices of all interference signals including an interference signal from an adjacent cell, it shows the best performance. However, if the interference covariance matrices are not correctly measured, its performance may be degraded so that it has a disadvantage in that the estimation of covariance matrices is complicated.

In the case of a UE with MMSE-IRC capability, the UE determines a reception weight matrix by applying MMSE-IRC so that the UE can obtain the optimal reception performance when receiving a PDSCH. However, referring to FIG. 13, when the nTTI UE receives the PDSCH in TI #n, the UE may separately calculate the weight matrix of symbol #3/#4 and the weight matrix of symbol #10/#11 to determine the corresponding weight matrix because the interference environment of symbol #3/#4 may be different from that of symbol #10/#11. In other words, the UE may calculate the weight matrix when receiving the PDSCH in symbol#3/#4 and then recalculate the weight matrix when receiving the PDSCH in symbol #10/#11.

Referring again to FIG. 13, when the nTTI UE receives the PDSCH in TI #n, the interference environment of symbol #3/#4 may be different from that of symbol #10/#11 as described above. If the UE needs to transmit multiple codeblocks in TI #n, the UE may perform the transmission such that each codeblock is not transmitted in different sTTIs by considering the different interference environments.

The above-described weight matrix calculation and codeblock configuration method for an MMSE-IRC receiver, which reflects that interference environments vary depending on sTTI regions, can be applied to not only DL data but UL data.

Based on the above discussion, the present invention propose a signal transmission and reception method between a UE and an eNB for coexistence of UEs to which different TTIs are applied when the UEs to which the different TTIs are applied transmit UL signals on the same resource.

In the following description, a UE to which a TTI with a first time length is applied is referred to as a first UE, and a UE to which a TTI with a second time length is applied is referred to as a second UE. In this case, the first time length may be shorter than the second time length.

The first UE receives a UL grant, which schedules UL signal transmission during a second time interval, from an eNB during a first time interval.

Next, the first UE receives information on several symbols within the second time interval from the eNB.

Thereafter, the first UE transmits at least one of a DM-RS, a PUCCH, and a PUSCH in different symbols according to a structure determined based on the TTI with the first time length during the second time interval. In particular, the first UE performs either puncturing or rate-matching on each of the one or more symbol indicated by the received information within the structure determined based on the TTI with the first time length or performs the DM-RS transmission regardless of the structure determined based on the TTI with the first time length.

In this case, the information on the several symbols within the second time interval may be transmitted during the first time interval.

Alternatively, the information on the several symbols within the second time interval may be transmitted during a third time interval located between the first and second time intervals. In this case, when the first UE performs either the puncturing or the rate-matching on at least one symbol among the symbols indicated by the received information within the structure determined based on the TTI having the first time length, whether the UE performs either the puncturing or the rate-matching may be determined based on a time difference between the second and third time intervals.

At this time, the first time length may be equal to a length of a single time interval, and in particular, the length of the single time interval may be equal to a length of a single slot period in the system.

Regarding the operation of the first UE, the structure determined based on the TTI with the first time length may include: a DM-RS transmitted in the first symbol within the single time interval; a PUSCH transmitted in the second to thirteenth symbols within the single time interval; and a PUCCH transmitted in the fourteenth symbol within the single time interval.

As another example, the structure determined based on the TTI with the first time length may include: a PDCCH transmitted in one or more symbols; a gap formed in one or more symbols; a PUSCH transmitted in one or more symbols; and a PUCCH transmitted in one or more symbols, along a time direction in the single time interval. In this case, more specifically, the structure determined based on the TTI with the first time length may include: a PDCCH transmitted in the first and second symbols in one frame or slot consisting of a total of fourteen symbols; a gap formed in the third symbol; a DM-RS transmitted in the fourth and fifth symbols; a PUSCH transmitted in the sixth to thirteenth symbols; and a PUCCH or a Sounding Reference Signal (SRS) transmitted in the fourteenth symbol.

Moreover, the information on the several symbols within the second time interval may include at least one of the following items: a location of a symbol where a UL signal is emptied out; whether either the puncturing or the rate-matching is performed as an operation for emptying the UL signal; a location of a symbol where a DM-RS is additionally transmitted; and sequence information of the additionally transmitted DM-RS.

Some of the information on the several symbols within the second time interval may be transmitted via higher layer signaling In response to the operation of the first UE, the eNB may receive a UL signal from the first UE during a time period in which the first UE to which the TTI with the first time length is applied coexists with the second UE to which the TTI with the second time length is applied as follows.

First, the eNB transmits the UL grant, which schedules the UL signal transmission during the second time interval, to the first UE during the first time interval.

Next, if the first and second UEs coexist during the second time interval, the eNB transmits the information on the several symbols within the second time interval to the first UE.

Thereafter, the eNB receives, from the first UE, the at least one of the DM-RS, the PUCCH, and the PUSCH in the different symbols according to the structure determined based on the TTI with the first time length during the second time interval. In this case, the eNB may receive, from the first UE1, UL signals where either the puncturing or the rate-matching is performed on each of the one or more symbols within the second time interval or the DM-RS.

Furthermore, the above-described technical details of the UE can be equally applied to the eNB.

3.3. Method of Transmitting and Receiving Signals Over Multiple TTIs

In this section, methods of transmitting and receiving UL/DL signals across a plurality of TTIs (slots or subframes) will be described.

3.3.1. Signal Transmission and Reception Method

This method can also be applied when UL control information is transmitted across multiple TTIs (slots or subframes). In other words, the UL control information (e.g., UCI, HARQ-ACK/CSI/SR (scheduling request)) can be transmitted over most or all of the multiple TTIs. Such a signal transmission and reception method has an advantage in that a UE located at a cell boundary (e.g., cell edge UE) can solve the coverage problem.

Hereinafter, if the number of symbols within one TTI used for transmitting a UL control channel is equal to or more than a predetermined value (e.g., 4), the UL control channel is defined as a long PUCCH. For example, the long PUCCH can be used for the purpose of providing wide coverage to a Machine Type Communication (MTC) UE with low UE Radio Frequency (RF) performance. In addition, to support wider coverage, the long PUCCH may be transmitted over a plurality of TTIs.

Figure 14:
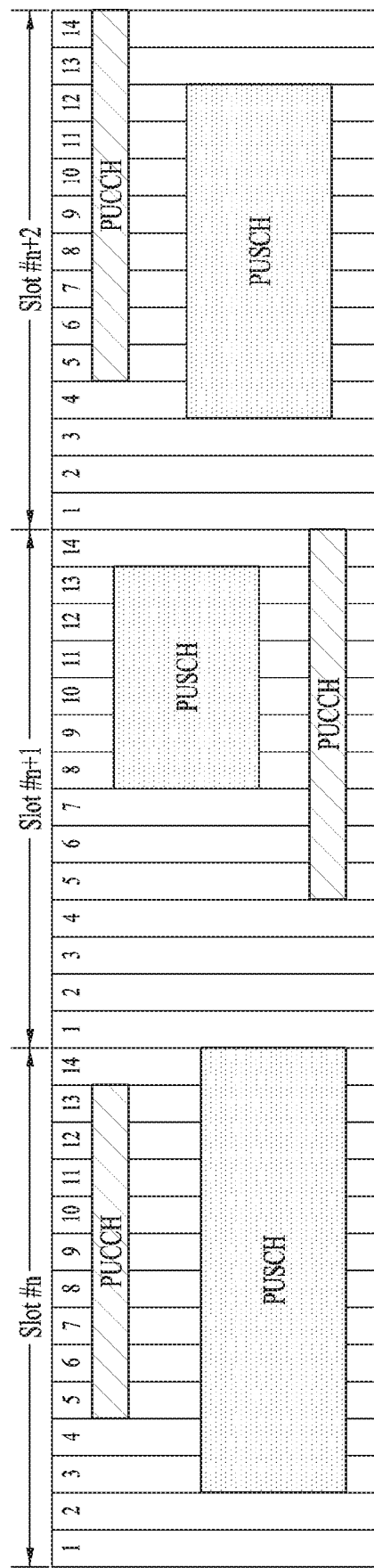
FIG. 14 illustrates an operation in which a UE transmits a long PUCCH and a PUSCH according to an embodiment of the present invention.

FIG. 14 illustrates an operation in which a UE transmits a long PUCCH and a PUSCH according to an embodiment of the present invention. In FIG. 14, one TTI is illustrated as one slot, and vertical and horizontal axes mean time and frequency domains, respectively. Hereinafter, the proposed signal transmission and reception methods will be described in detail with reference to FIG. 14.

The region in which the long PUCCH is transmitted can be configured via DCI (e.g., DL assignment or higher layer signaling). A UE may empty a symbol(s) in the long PUCCH region by considering at least one of the following: DL control/DL data/guard period/DL signal/UL data/UL signal. Thereafter, the UE may transmit a punctured long PUCCH or a long PUCCH configured to be shorter than a TTI according to a predetermined rule. In this case, the DCI or higher layer signaling for the long PUCCH may include some or all of the following items.

- The location of a symbol(s) that should be emptied per TTI (or for all TTIs) when the long PUCCH is transmitted over multiple TTIs
- Specific frequency resources in the symbol(s) that should be emptied per TTI (or for all TTIs) when the long PUCCH is transmitted over multiple TTIs In addition, a plurality of TTIs used/allocated for transmitting one long PUCCH may be composed of consecutive TTIs or non-consecutive TTIs (as a particular example, periodic TTIs with a specific periodicity may be used). In this case, a time period (e.g., symbols) used for the long PUCCH transmission may be composed of consecutive symbols (in the time domain) except a specific symbol(s) (e.g., first symbol).

The corresponding specific symbol(s) (which are excluded from the PUCCH transmission) may be designated as a symbol(s) reserved for DL control transmission and/or a guard period (for example, the maximum value of DL control transmission symbol duration configured per TTI or for all TTIs). Thus, the UE may operate by assuming/considering that there is no scheduling for DL data transmission in the TTI allocated for transmitting the long PUCCH (that is, there may be only scheduling for UL data transmission). For example, if the UE detects DL grant DCI that schedules DL data transmission within the TTI allocated for the long PUCCH, the UE may neglect the corresponding DCI.

Moreover, the above-described (PUCCH transmission) symbol allocation in one TTI can be equally applied to a plurality of TTIs used/allocated for transmitting one long PUCCH. In this case, the number of symbols allocated for the PUCCH transmission within one TTI may be constant for all TTIs or vary per TTI.

Alternatively, a UL region may be configured per TTI or for all TTIs, and the some or all of the symbols in the corresponding UL region may be used for the PUCCH transmission. For example, if long PUCCH transmission is configured over a total of two TTIs or slots, i.e., slot #n+1 and slot #n+2 as shown in FIG. 14, the first four symbols in each slot may be reserved for DL control (and/or a guard period). Alternatively, in one slot, the last twelve symbols are set as a UL region in advance, and in the two slots, the last ten symbols among the twelve symbols are set as a long PUCCH region (see the PUCCH in slot #n+1 of FIG. 14).

Additionally, information about a time when frequency hopping is applied to such a long PUCCH and/or information about a frequency hopping interval may be configured/indicated via DCI or higher layer signaling. In this case, the frequency hopping may be hopping in a single TTI (or slot), inter-TTI (or inter-slot) hopping as shown in FIG. 14, or hopping every several slots (for example, hopping may be performed every two slots).

Alternatively, if frequency hopping is applied to long PUCCH transmission resources, hopping in a single slot may not be allowed. In other words, only inter-slot hopping can be applied to the long PUCCH transmission resources, and the hopping in the single slot is not applied. In addition, this hopping operation may be applied to a multi-TTI PUSCH or a multi-slot PUSCH (for example, a PUSCH transmitted over multiple TTIs).

Moreover, in the case of a Frequency Division Duplex (FDD) carrier, long PUCCH transmission may be performed on all symbols in slots. For example, if a long PUCCH is configured over three consecutive slots, a UE may transmit the long PUCCH in all symbols within the three consecutive slots.

However, considering SRS transmission in a specific slot and/or short duration PUCCH (e.g., one-symbol PUCCH), the UE may transmit the long PUCCH by emptying some symbols even in the case of using the FDD carrier according to the present invention.

In this case, frequency hopping may be configured (or allowed) at non-consecutive points in the time domain only for a non-continuously transmitted long PUCCH rather than a continuously transmitted long PUCCH. The reason for this is to prevent performance degradation in the continuously transmitted long PUCCH, which is caused by a power transient period. The above-mentioned method can be applied to not only the FDD carrier but normal systems (e.g., Time Division Duplex (TDD) subcarrier).

Accordingly, in the case of a long PUCCH transmitted over multiple slots, all symbols in several slots may be set as a UL control region, and several symbols in some slots may be set as the UL control region in consideration of a DL control region and/or a guard period. In this case, frequency hopping may be applied/configured at non-consecutive points in the time domain.

3.3.2. Method of Configuring Transmission Region in Time Domain

Hereinafter, methods of configuring a transmission region in the time domain, which can be applied to a single slot or multi-slot based long PUCCH, a PUSCH, or a PDSCH, will be described. The matters applicable to the long PUCCH in the above-described description as well as the following description can be equally applied to the PUSCH or PDSCH.

3.3.2.1. First Method

The number of slots where a long PUCCH (PUSCH or PDSCH) is transmitted and indices thereof can be determined by RRC signaling, first layer (e.g., PHY, L1) signaling, or a combination thereof. And, the number of symbols per slot where the long PUCCH (PUSCH or PDSCH) is transmitted and indices thereof can be determined by L1 signaling.

In this case, the combination of the RRC signaling and L1 signaling may be used as follows: similar to an ACK/NACK Resource Indicator (ARI) of the LTE system, candidates are configured via the RRC signaling, and then one of the corresponding candidates is indicated via the L1 signaling. In addition, the L1 signaling indicating the number of symbols and indices thereof may be carried by UE-specific DCI, UE-group common DCI, or cell-common DCI.

For example, when an indicator indicating how DL control/DL data/GP/UL control/UL data are configured in a slot (or a slot format/type) (hereinafter, this type of indicator is referred to as a slot format indicator) is transmitted on a UE-group or cell-common PDCCH, a UE may recognize the UL control region (UL data region or DL data region) of each slot based on the corresponding information and assume that the long PUCCH (PUSCH or PDSCH) is transmitted in the corresponding region.

As another method, the number of slots where a long PUCCH (PUSCH or PDSCH) is transmitted, indices thereof, and a starting symbol index of each slot can be determined by RRC signaling, L1 signaling, or a combination thereof. And, symbol duration of the long PUCCH (PUSCH or PDSCH) in each slot can be determined by the L1 signaling.

As a further method, the number of slots where a long PUCCH (PUSCH or PDSCH) is transmitted, indices thereof, and symbol duration of each slot can be determined by RRC signaling, L1 signaling, or a combination thereof. And, the index of the starting (or ending) symbol of each slot where the long PUCCH (PUSCH or PDSCH) is transmitted can be determined by the L1 signaling.

3.3.2.2. Second Method

The number of symbols per slot where a long PUCCH (PUSCH or PDSCH) is transmitted and indices thereof as well as the number of slots where the long PUCCH (PUSCH or PDSCH) is transmitted and indices thereof can be determined by RRC signaling, L1 signaling, or a combination thereof.

In this case, the combination of the RRC signaling and L1 signaling may be used as follows: similar to an ARI of the LTE system, candidates are configured via the RRC signaling, and then one of the corresponding candidates is indicated via the L1 signaling. Specifically, the number of symbols used for transmitting the long PUCCH (PUSCH or PDSCH) in a slot may be configured per slot index by the RRC signaling, and the indices of the slots where the long PUCCH (PUSCH or PDSCH) is transmitted may be indicated by dynamic L1 signaling. In other words, the time-domain region where the long PUCCH (PUSCH or PDSCH) is transmitted may be configured by the combination of the RRC signaling and L1 signaling.

In this case, the time-domain region where the long PUCCH (PUSCH or PDSCH) is transmitted, which is configured by the combination of the RRC signaling and L1 signaling, may be different from a region for the long PUCCH (PUSCH or PDSCH) where a UL control region (UL data region or DL data region), which is signaled by a slot format indicator, is configured. Thus, a UE basically performs transmission based on the region signaled by the slot format indicator, but different transmission methods may be applied according to the degrees of overlapping between the regions indicated by the two methods.

(1) A Case in which the Long PUCCH (PUSCH or PDSCH) Symbol Region is not Configured within the Region Signaled by the Slot Format Indicator For example, if the region signaled by the slot format indicator is composed of symbols #3 to #10 and the long PUCCH (PUSCH or PDSCH) region is composed of symbols #4 to #12, an eNB or a UE may apply the following transmission method as a symbol #3 based transmission method. Specifically, to minimize the impact of misalignment between the eNB and the UE, the eNB or UE may transmit a PUSCH or a PDSCH by including only redundancy bits in the corresponding region (i.e., the region which is signaled by the slot format indicator but not included in the time-domain transmission region configured by the other indication method) or repeatedly transmit a specific symbol (e.g., some symbols among symbols #4 to #10).

(2) A Case in which the Long PUCCH (PUSCH or PDSCH) Region is Configured Outside of the Region Signaled by the Slot Format Indicator For example, if the region signaled by the slot format indicator is composed of symbols #3 to #10 and the long PUCCH (PUSCH or PDSCH) region is composed of symbols #4 to #12, an eNB or a UE may apply the following transmission method as a symbol #11/#12 based transmission method. Specifically, to minimize the impact of misalignment between an eNB and a UE, the eNB or UE may be configured to perform puncturing in the corresponding region (i.e., the region which is not signaled by the slot format indicator but included in the time-domain transmission region configured by the other indication method).

3.3.3. Signal Transmission and Reception Method when Long PUCCH and PUSCH are Simultaneously Scheduled A long PUCCH may be configured to be transmitted over three slots as shown in FIG. 14, and at the same time, PUSCH transmission may also be scheduled in the corresponding slots (or some of the corresponding slots). In this case, the following three methods can be applied. These methods may be equally applied not only to a long PUCCH transmitted over multiple slots but a long PUCCH transmitted in a single slot.

3.3.3.1. First Method

When a PUSCH and a long PUCCH are configured in the same slot, a scheduling restriction may be imposed such that the starting/ending symbol of the PUSCH should be equal to that of the long PUCCH. Accordingly, when the PUSCH and long PUCCH are in the same slot, a UE may not expect that the PUSCH and long PUCCH have different starting/ending symbols. In other words, the UE may expect that the starting/ending symbol of the PUSCH is equal to that of the long PUCCH.

3.3.3.2. Second Method

When a PUSCH and a long PUCCH are configured in the same slot, puncturing or rate-matching may be performed on either the PUSCH or long PUCCH with reference to a shorter channel.

For example, in slot #n of FIG. 14, puncturing or rate-matching may be performed on the two front symbols and/or one rear symbol of the PUSCH with reference to the PUCCH, which is shorter. In this case, if the two front symbols are punctured or rate-matched, a DM-RS may be transmitted in the first symbol of the actually transmitted PUSCH.

As another example, in slot #n+1 of FIG. 14, puncturing may be performed on the three front symbols and/or one rear symbol of the PUCCH with reference to the shorter PUSCH, or the PUCCH may be transmitted using a PUCCH format preconfigured with reference to the shortened length.

3.3.3.3. Third Method

When a PUSCH and a long PUCCH are configured in the same slot, repetition or rate-matching may be performed on either the PUSCH or long PUCCH with reference to a longer channel. In addition, for the PUSCH, redundancy bits may be transmitted in the extended resource region (if the long PUCCH is longer than the PUSCH).

For example, in slot #n of FIG. 14, the two front symbols and/or one rear symbol of the PUCCH may be repeated with reference to the longer PUSCH, or the PUCCH may be transmitted using a PUCCH format preconfigured with reference to the increased length. In this case, if the two front symbols are repeated, a signal to be transmitted in the fifth and sixth symbols of FIG. 14 may be transmitted in the third and fourth symbols.

As another example, in slot #n+1 of FIG. 14, the three front symbols and/or one rear symbol of the PUSCH may be repeated with reference to the longer PUCCH, or the PUSCH may be transmitted after performing rate-matching with reference to the increased length. When the repetition is applied, if a DM-RS is transmitted in the eighth symbol, a signal to be transmitted in the ninth/tenth/eleventh symbol may be repeatedly transmitted in the fifth/sixth/seventh symbol. Alternatively, when the rate-matching is performed with reference to the increased length, a DM-RS may still be transmitted in the eighth symbol and it may also be transmitted in the fifth symbol.

When a PUSCH and a long PUCCH are configured in the same slot as shown in slot #n+2 of FIG. 14 or when a PUSCH time region partially overlaps with a long PUCCH time region, transmission may be performed by considering the total length of each channel as described in the second or third method.

Alternatively, the above-described transmission methods can be independently applied to the starting and ending points of the PUSCH/long PUCCH in the slot. For example, the second method may be applied to the starting point so that the PUSCH may not be transmitted in the fourth symbol. On the other hand, the third method may be applied to the ending point so that the PUSCH may not be transmitted in the thirteenth/fourteenth symbol.

In applying the proposed methods, priority may be configured between the channels. For example, a rule may be established such that the transmission length of the long PUCCH is maintained (not shortened) by giving priority to stable transmission of the long PUCCH. That is, the third method may be applied to slot #n+1 of FIG. 14.

3.3.4. Signaling Method for Supporting Signal Transmission and Reception

Hereinafter, a particular signaling method for informing locations of symbols that should be emptied per sTTI included in a long TTI when the long TTI includes multiple sTTIs will be described. Such a method may be similar to informing the starting/ending point of each TTI when multiple TTIs are scheduled by a piece of DCI as shown in the example of FIG. 10. Although the method is described with an example of scheduling multiple TTIs through a piece of DCI for convenience of description, the corresponding method can be equally applied when locations of symbols that should be emptied are informed per sTTI included in a long TTI. Further, the corresponding method can be applied to not only DL data transmission but UL data/control transmission.

(1) DL/UL Data/Control Starting Point

For the full flexibility, an eNB may inform a UE of the location of the starting symbol of DL or UL data/control per TTI through DCI. In this case, to reduce signaling overhead, the starting symbols of DL or UL data/control in some TTIs may be indicated through DCI, but the starting symbols of DL or UL data/control in the remaining TTIs may be fixed (to predetermined values) by higher layer signaling.

For example, the location of the starting symbol of the DL or UL data/control within the first scheduled TTI may be indicated through DCI, but the locations of the starting symbols of DL or UL data/control in later TTIs may be configured by RRC signaling.

Alternatively, as another method for reducing signaling overhead, starting symbol candidates of DL or UL data/control in each TTI may be limited (to predetermined values) by higher layer signaling, and the actual starting symbol of the DL or UL data/control in each TTI may be indicated by DCI.

For example, an eNB may limit the starting symbol candidates of the DL or UL data/control in each TTI to two symbols and then inform a UE of the actual starting symbol using bitmap information. If the starting symbol, which is configured by RRC signaling or dynamically, is the first symbol of a corresponding TTI, it may mean that the UE does not have to attempt DL control reception in the corresponding TTI. In other words, the UE may expect that there is no DL control reception in the corresponding TTI. When the starting symbol of UL data/control is indicated, the symbol prior to the corresponding symbol may be used as a DL/UL gap. That is, a rule may be established such that the corresponding symbol is not used as a DL control region.

(2) DL or UL Data/Control Ending Point

If UL control is able to be located at the last time point in each TTI, the ending point of DL or UL data/control in each TTI may be dynamically changed as well. Similar to the method of signaling a starting point of DL or UL data/control, the location of the ending symbol of the DL or UL data/control in each TTI may be indicated through DCI.

To reduce signaling overhead, the ending symbols of DL or UL data/control in some TTIs may be indicated through DCI, but the ending symbols of DL or UL data/control in the remaining TTIs may be fixed (to predetermined values) by higher layer signaling.

Alternatively, ending symbol candidates of the DL or UL data/control in each TTI may be limited (to predetermined values) by higher layer signaling, and the actual ending symbol of the DL or UL data/control in each TTI may be indicated by DCI.

Moreover, the ending symbols of DL or UL data/control in all TTIs may be fixed (to predetermined values) by higher layer signaling, the locations of the ending symbols of the DL or UL data/control may not be indicated by DCI.

3.4. Signal Transmission and Reception Method when Multiple TTIs are Scheduled by Single Piece of DCI FIG. 15 illustrates a case in which multiple TTIs are scheduled by a piece of DCI.

Figure 15:
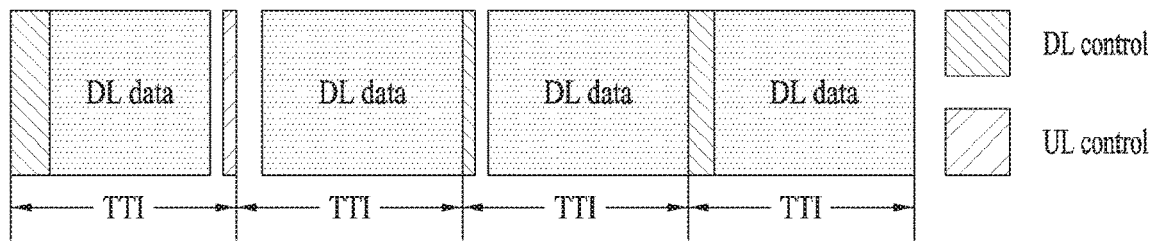
FIG. 15 illustrates a case in which multiple TTIs are scheduled by a piece of DCI.

When multiple TTIs are scheduled by a single piece of DCI as shown in the example of FIG. 15, an Uplink Control Information (UCI) feedback method (e.g., time/frequency resources and/or uplink control formats) may vary depending on the number of TTIs scheduled by the piece of DCI (or the maximum number of TTIs that can be scheduled by the corresponding DCI).

Specifically, various UCI formats may be configured depending on the amount and/or type of UCI (e.g., an uplink control indicator, HARQ-ACK, CSI, a scheduling request (SR), beam information, etc.) contained in UL control, and a rule may be established as follows: these formats depend on the number of TTIs scheduled by DCI (or the maximum number of TTIs that can be scheduled by the corresponding DCI). In addition, time/frequency resource candidate where UCI will be actually transmitted may be defined per format by higher layer signaling, and the locations of the resources that will be actually used among the UCI resources may be dynamically indicated by the DCI that schedules multiple TTIs. This feature could be interpreted to mean that an appropriate UCI transmission format is determined depending on the number of scheduled TTIs (or the maximum number of TTIs that can be scheduled by the corresponding DCI) and different UCI resources are applied according to the determined format.

When the multiple TTIs are scheduled by the single piece of DCI as shown in the example of FIG. 15, one Transport Block (TB) may be transmitted for the corresponding TTIs or it may be transmitted per TTI. In addition, one TB may be transmitted in each TTI group consisting of multiple TTIs.

Such a TB configuration method, which depends on the TTI, may be signaled to a UE through DCI (L1 signaling or higher layer signaling). For example, explicit 1-bit information in DCI can be used. That is, if the corresponding field is set to '0', it may indicate that one TB is configured for all TTIs scheduled by the corresponding DCI. If the corresponding field is set to '1', it may indicate that in case the corresponding DCI schedules multiple TTIs, one TB is separately transmitted per TTI. As another example, the method of configuring a TB(s) for scheduled TTIs may vary according to the TB size (and TTI or the combination relationship between scheduled REs) indicated by DCI. In other words, if the TB size is equal to or more than X, it may indicate one TB is configured for all TTIs scheduled by the corresponding DCI. On the contrary, if the TB size is less than X, it may indicate that one TB is transmitted per TTI when the corresponding DCI schedules multiple TTIs.

If the method of configuring a TB(s) for TTIs scheduled by DCI (L1 signaling or higher layer signaling) is able to be changed as described above, a method of transmitting HARQ-ACK (or UCI) corresponding to the TB(s) may also vary according to the TB configuration method.

Specifically, as the number of TBs transmitted over a plurality of TTIs scheduled by DCI increases, an HARQ-ACK (or UCI) payload size may increase. In addition, depending on the HARQ-ACK payload size, the format/timing/resource of a PUCCH to be transmitted may vary. Similarly, compared to a case in which many TBs (for example, a plurality of TBs) are transmitted over the plurality of TTIs scheduled by the DCI with a case in which small TBs (for example, one TB) are transmitted over the plurality of TTIs scheduled by the DCI, different PUCCH formats/timing/resources may be configured. At this time, a maximum payload size supported by a PUCCH format configured when many TBs (for example, a plurality of TBs) are present may be greater than a maximum payload size supported by a PUCCH format configured when small TBs (for example, one TB) are present. For example, when DCI schedules three TTIs and one TB is scheduled to be transmitted, 1-bit HARQ-ACK may be configured. On the other hand, when DCI schedules three TTIs and three TBs are scheduled to be transmitted (one TB is transmitted per TTI), 3-bit HARQ-ACK may be configured as feedback thereof.

As another method, an HARQ-ACK (or UCI) payload size may be constantly maintained regardless of the number of TBs transmitted over a plurality of TTIs scheduled by DCI. For example, for multiple codeblocks (CBs) included in one TB, HARQ-ACK transmission may be supported per CB or CB group. In addition, the HARQ-ACK payload size corresponding to the DCI may be set to K bits in advance (via L1 signaling or higher layer signaling). Thus, one or more TBs may be configured for the TTIs scheduled by the corresponding DCI, and HARQ-ACK transmission may be defined for each CB group consisting of M CBs. At this time, the value of M may be defined such that the number of CB groups each including M CBs is equal to the value of K, and the value of M may vary per CB group. For example, when DCI schedules three TTIs and three TBs are scheduled to be transmitted (one TB is transmitted per TTI), each TB may be composed of four CBs. If an HARQ-ACK payload size is 6 bits, a UE may create CB groups each including two CBs and feedback 6-bit HARQ-ACK per CB group.

Figure 16:
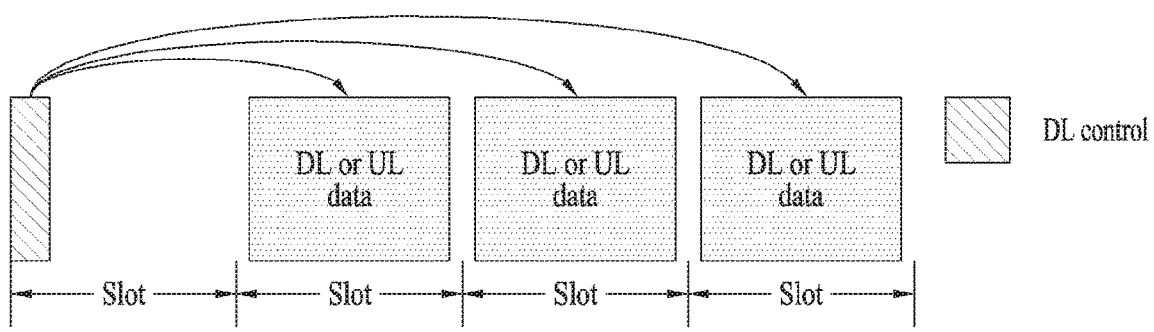
FIG. 16 illustrates an operation in which multiple slots (TTIs or subframes) are scheduled by a piece of DCI.

FIG. 16 illustrates an operation in which multiple slots (TTIs or subframes) are scheduled by a piece of DCI.

When multiple slots (TTIs or subframes) are scheduled by a single piece of DCI as shown in the example of FIG. 16, data scheduled in each slot may be DL or UL data. In other words, when the multiple slots are scheduled by the single piece of DCI, not only DL data but UL data may be scheduled together. At this time, whether each slot has either DL data or UL data may be indicated. In addition, in the case of DL data, a PUCCH resource corresponding to the data may be scheduled.

For example, DCI (e.g., DCI where DL and UL are unified) may schedule DL data and at the same time, indicate a piggyback of HARQ-ACK corresponding to the DL data on UL data. In this case, since an eNB does not need to consider a grant missing case for the UL data that piggybacks the HARQ-ACK, the eNB may not reserve PUCCH resources additionally. In addition, if HARQ-ACK is piggybacked in a UL data region, rate-matching may be performed on UL data in an HARQ-ACK region instead of puncturing so that the performance of UL data transmission can be improved.

Meanwhile, when DL and UL data is simultaneously scheduled by a piece of DCI, a Resource Assignment (RA) field and an HARQ process index of the DCI may be commonly configured by considering DCI overhead. That is, an RB region in which the DL data is received is equal to an RB region in which the UL data is transmitted, and the same HARQ process index may be configured as well. Instead, if multiple slots are scheduled in the same link direction, the HARQ process index may increase by 1. For example, if a piece of DCI schedules slot #n, slot #n+1, and slot #n+2, the piece of DCI may respectively schedule DL data, UL data, and DL data in the individual slots and also indicate that the HARQ process index is 3. In this case, upon receiving the piece of DCI, a UE may recognize that the HARQ process index for slot #n and slot #n+1 is 3 and the HARQ process index for slot #n+2 is 4.

Figure 17:
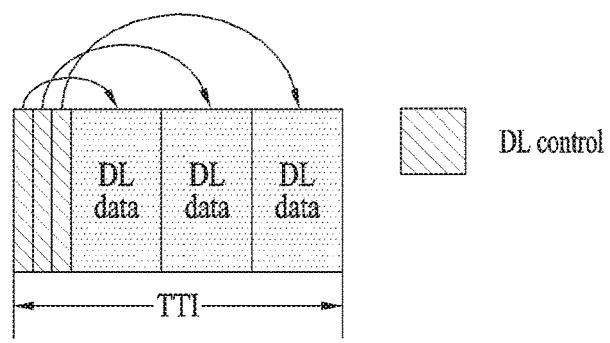
FIG. 17 illustrates a DL data transmission method where Time Division Multiplexing (TDM) within a single TTI is applied.

FIG. 17 illustrates a DL data transmission method where TDM within a single TTI is applied.

Although FIG. 17 shows a case in which DL data transmission is scheduled through TDM in a single TTI, the present invention can be applied when UL data transmission is scheduled.

Such an operation has an advantage in that regarding TDM between UEs in different beam directions on the assumption of analog beamforming, UE multiplexing in a single TTI can be improved by dividing the single TTI into a plurality of time resource units and allocating the plurality of time resource units to the UEs. In this case, the following method may be applied to allocate DL (or UL) data resources.

When a single TTI is divided into N Time Units (TUs) in the time domain, a resource region where DL or UL data/control is actually scheduled among the N TUs can be informed a UE per TTI. Particularly, (similar to UL resource allocation type 0 and the Resource Indication Value (RIV) scheme of the legacy LTE system) scheduling may be allowed only for consecutive TUs. This is because in the case of data transmitted/received in the same direction, use of consecutive resources in the time domain is more efficient.

Considering that a DL control region, a GP, and a UL control region can be dynamically changed, the sizes of a DL data region and a UL data/control region can also vary. Thus, a method of configuring TUs in a single TTI may vary as well. Alternatively, considering that there may be a UE that does not recognize the sizes of the dynamically changed DL control region/GP/UL control region, the sizes of some TUs may be fixed and only the sizes of specific TUs may be configured to vary. For example, the sizes of the first TU and/or last TU in a certain TTI may be configured to vary.

In the case of the first TU, TUs may be configured by assuming that there is no DL control region (and GP) or considering the minimum time period (e.g., one symbol) or the maximum time period (e.g., three symbols) of a corresponding region. If the size of the DL control region (and GP) in each TTI is informed (through dynamic signaling), the starting point of the first TU may be configured by excluding the size of the corresponding region. For example, if a UE is informed that the DL control region in the corresponding TTI is composed of two symbols through a PCFICH or a slot format indicator after configuring TUs by assuming that the DL control region (and GP) is composed of one symbol, the UE may recognize that the starting symbol of the first TU is the second symbol.

In the case of the last TU, TUs may be configured by assuming that there is no UL control region (and GP) or considering the minimum time period (e.g., one symbol) or the maximum time period (e.g., three symbols) of a corresponding region. If a UE is informed of the size of the UL control region (and GP) in each TTI, the UE may configure the ending point of the last TU by excluding the size of the corresponding region. For example, if the UE is informed that the UL control region in the corresponding TTI is composed of two symbols through DCI after configuring TUs by assuming that there is no UL control region (and GP), the UE may recognize that the ending symbol of the last TU is the third last symbol in the corresponding TTI.

Since each of the examples of the proposed methods can be considered as one method for implementing the present invention, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from an eNB to a UE through a predefined signal (e.g., physical layer signal, higher layer signal, etc.).

4. Device Configuration

Figure 18:
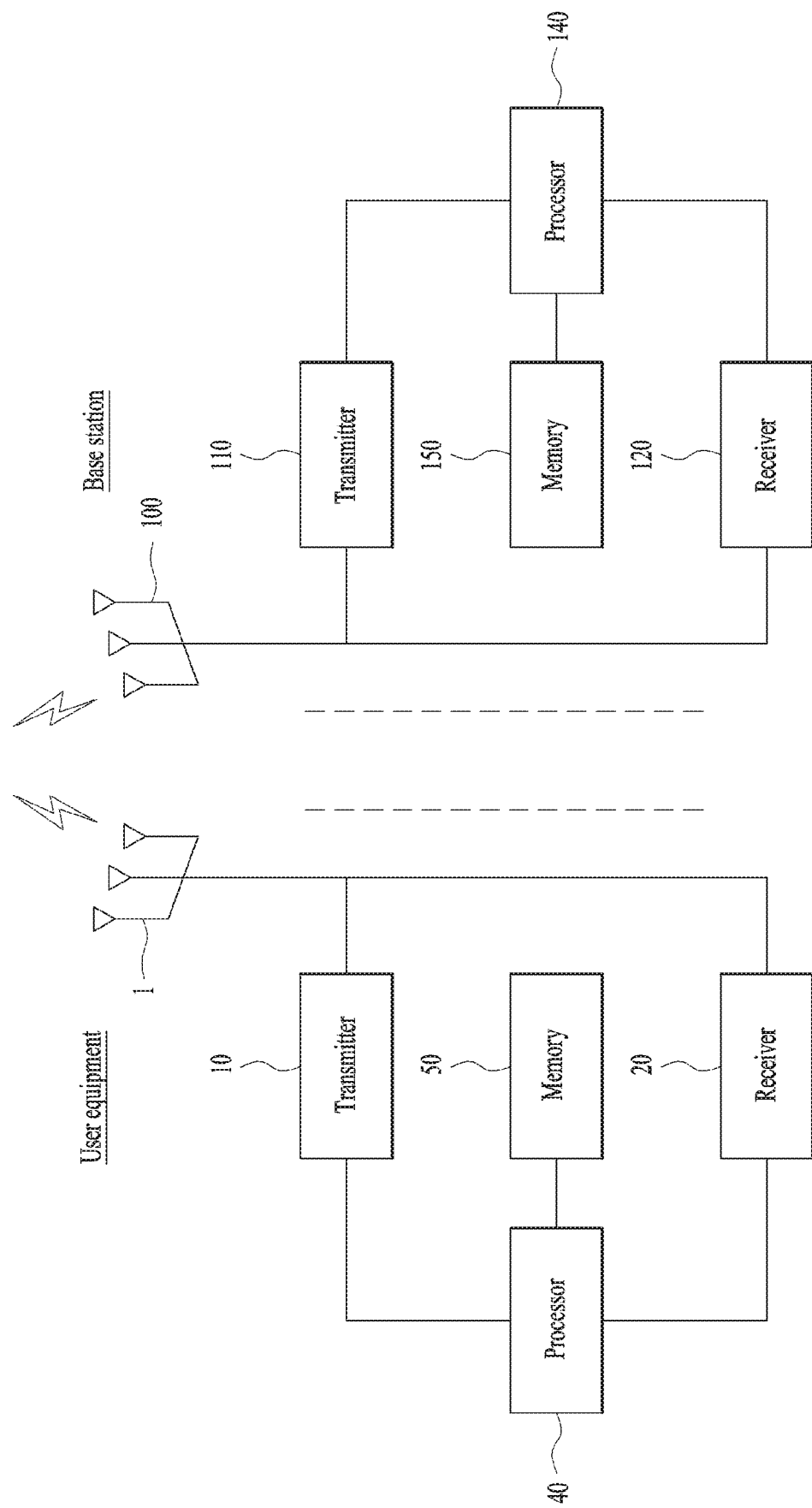
FIG. 18 a diagram illustrating configuration of a user equipment and a base station for implementing the proposed embodiments.

FIG. 18 is a diagram illustrating configurations of a UE and a base station capable of being implemented by the embodiments proposed in the present invention. The UE and the base station shown in FIG. 18 operate to implement the embodiments of the method for transmitting and receiving PUCCH between the UE and the base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the BS 100 may receive a UL signal from the first UE 1 during a time period in which the first UE 1 to which a TTI having a first time length is applied coexists with a second UE to which a TTI having a second time length is applied as follows.

Specifically, the BS 100 may transmit a UL grant, which schedules UL signal transmission during a second time interval, to the first UE 1 during a first time interval through the transmitter 110. If the first UE 1 and the second UE coexist during the second time interval, the BS 100 may transmit information on several symbols within the second time interval to the first UE 1. Next, the BS 100 may receive at least one of a DM-RS, a PUCCH, and a PUSCH in different symbols according to a structure determined based on the TTI having the first time length from the first UE 1 during the second time interval through the receiver 120. In this case, the BS 100 may receive, from the first UE 1, UL signals where either puncturing or rate-matching is performed on each of the one or more symbols within the second time interval or the DM-RS.

In addition, the first UE 1 may receive an UL grant, which schedules UL signal transmission during a second time interval, from the BS 100 during a first time interval through the receiver 20. And, the first UE 1 may receive information on several symbols within the second time interval from the BS 100. Next, the first UE 1 may transmit at least one of a DM-RS, a PUCCH, and a PUSCH in different symbols according to a structure determined based on the TTI having the first time length during the second time interval. In this case, the signal transmission may include performing either puncturing or rate-matching on each of the one or more symbols indicated by the received information within the structure determined based on the TTI having the first time length or transmitting the DM-RS irrespective of the structure determined based on the TTI having the first time length.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of operating a User Equipment (UE) in a wireless communication system that includes a base station (BS), the method comprising:
   receiving, from the BS, downlink control information (DCI); and
   transmitting, to the BS, a Physical Uplink Control Channel (PUCCH) signal according to a PUCCH configuration that is selected from a set of PUCCH configurations based on the DCI,
   wherein each PUCCH configuration of the set of PUCCH configurations identifies:
      a corresponding number of PUCCH symbols to be used for transmitting the PUCCH, and
      a corresponding PUCCH symbol index to be used for transmitting the PUCCH, and
   wherein the PUCCH configuration is selected from the set of PUCCH configurations based on a slot index included in the DCI.

2. The method of claim 1, wherein the set of PUCCH configurations is provided via a higher layer of the UE.

3. The method of claim 1, wherein the PUCCH symbol index comprises an index for a starting PUCCH symbol.

4. The method of claim 1, wherein the DCI is UE-specific DCI.

5. A User Equipment (UE) for operating in a wireless communication system that includes a base station (BS), the UE comprising:
   a memory;
   a transceiver; and
   a processor operatively connected to the memory and the transceiver, the processor for:
      receiving, from the BS, downlink control information (DCI); and
      transmitting, to the BS, a Physical Uplink Control Channel (PUCCH) signal according to a PUCCH configuration that is selected from a set of PUCCH configurations based on the DCI,
      wherein each PUCCH configuration of the set of PUCCH configurations identifies:
         a corresponding number of PUCCH symbols to be used for transmitting the PUCCH, and
         a corresponding PUCCH symbol index to be used for transmitting the PUCCH, and
      wherein the PUCCH configuration is selected from the set of PUCCH configurations based on a slot index included in the DCI.

6. The UE of claim 5, wherein the set of PUCCH configurations is provided via a higher layer of the UE.

7. The UE of claim 5, wherein the PUCCH symbol index comprises an index for a starting PUCCH symbol.

8. The UE of claim 5, wherein the DCI is UE-specific DCI.

9. A method of operating a base station (BS) in a wireless communication system that includes a User Equipment (UE), the method comprising:
   transmitting, to the UE, downlink control information (DCI); and
   receiving, from the UE, a Physical Uplink Control Channel (PUCCH) signal according to a PUCCH configuration that is selected by the UE from a set of PUCCH configurations based on the DCI,
   wherein each PUCCH configuration of the set of PUCCH configurations identifies:
      a corresponding number of PUCCH symbols to be used by the UE for transmitting the PUCCH, and
      a corresponding PUCCH symbol index to be used by the UE for transmitting the PUCCH, and
   wherein the PUCCH configuration is selected from the set of PUCCH configurations based on a slot index included in the DCI.

10. The method of claim 9, wherein the set of PUCCH configurations is provided to the UE by the BS.

11. The method of claim 9, wherein the PUCCH symbol index comprises an index for a starting PUCCH symbol.

12. The method of claim 9, wherein the DCI is UE-specific DCI.

13. A base station (BS) for operating in a wireless communication system that includes a User Equipment (UE), the BS comprising:
   a memory;
   a transceiver; and
   a processor operatively connected to the memory and the transceiver, the processor for:
      transmitting, to the UE, downlink control information (DCI); and
      receiving, from the UE, a Physical Uplink Control Channel (PUCCH) signal according to a PUCCH configuration that is selected by the UE from a set of PUCCH configurations based on the DCI, wherein each PUCCH configuration of the set of PUCCH configurations identifies:
   a corresponding number of PUCCH symbols to be used by the UE for transmitting the PUCCH, and
   a corresponding PUCCH symbol index to be used by the UE for transmitting the PUCCH, and wherein the PUCCH configuration is selected from the set of PUCCH configurations based on a slot index included in the DCI.

14. The BS of claim 13, wherein the set of PUCCH configurations is provided to the UE by the BS.

15. The BS of claim 13, wherein the PUCCH symbol index comprises an index for a starting PUCCH symbol.

16. The BS of claim 13, wherein the DCI is UE-specific DCI.

* * * * *